(12) United States Patent
Kamekawa et al.

(10) Patent No.: US 11,843,751 B2
(45) Date of Patent: Dec. 12, 2023

(54) INFORMATION PROCESSING APPARATUS, CONTROL METHOD, AND COMPUTER-READABLE MEDIUM FOR USING BLOCKCHAIN TO MANAGE ELECTRONIC DATA

(71) Applicant: CANON KABUSHIKI KAISHA, Tokyo (JP)

(72) Inventors: Mikihiko Kamekawa, Tokyo (JP); Kei Sato, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 94 days.

(21) Appl. No.: 17/576,847

(22) Filed: Jan. 14, 2022

(65) Prior Publication Data

US 2022/0141353 A1 May 5, 2022

Related U.S. Application Data

(63) Continuation of application No. PCT/JP2020/024578, filed on Jun. 23, 2020.

(30) Foreign Application Priority Data

Jul. 19, 2019 (JP) .................................. 2019-133579

(51) Int. Cl.
*H04N 1/44* (2006.01)
*G06F 3/12* (2006.01)
*H04L 9/32* (2006.01)
*H04L 9/00* (2022.01)

(52) U.S. Cl.
CPC ......... *H04N 1/4433* (2013.01); *G06F 3/1222* (2013.01); *G06F 3/1238* (2013.01); *H04L 9/3226* (2013.01); *H04N 1/4413* (2013.01); *H04L 9/50* (2022.05)

(58) Field of Classification Search
None
See application file for complete search history.

(56) References Cited

U.S. PATENT DOCUMENTS 11,170,092 B1\* 11/2021 Liang .................... H04L 9/0637
2021/0133359 A1\* 5/2021 Liu .......................... G06F 21/64

FOREIGN PATENT DOCUMENTS

| JP | 2018128823 A | 8/2018 |
| JP | 2019053427 A | 4/2019 |
| JP | 2019092120 A | 6/2019 |

\* cited by examiner

*Primary Examiner* — Thomas D Lee
(74) *Attorney, Agent, or Firm* — Canon U.S.A., Inc. IP Division

(57) ABSTRACT

Processing of an electronic file using blockchain is performed in an image forming apparatus to decrease the number of apparatuses to be managed and reduce the management load.

13 Claims, 18 Drawing Sheets

INFORMATION PROCESSING APPARATUS, CONTROL METHOD, AND COMPUTER-READABLE MEDIUM FOR USING BLOCKCHAIN TO MANAGE ELECTRONIC DATA

CROSS-REFERENCE TO RELATED APPLICATIONS

This application is a Continuation of International Patent Application No. PCT/JP2020/024578, filed Jun. 23, 2020, which claims the benefit of Japanese Patent Application No. 2019-133579, filed Jul. 19, 2019, both of which are hereby incorporated by reference herein in their entirety.

TECHNICAL FIELD

The present invention relates to an information processing apparatus, a control method, and a program, which address tampering of recording of electronic data using blockchain.

BACKGROUND ART

In order to prevent tampering of electronic files, a technique is known which ensures the reliability of change of the contents of the electronic files by using the blockchain (refer to PTL 1).

CITATION LIST

Patent Literature

PTL 1 Japanese Patent Laid-Open No. 2018-128823

It is required to guarantee the reliability of processing to an electronic file in registration of information about the electronic file in a blockchain service. To this end, it is necessary to install credential used in an application or processing in an apparatus (generally a personal computer (PC)) used by a worker. In this case, the worker is required to manage several PCs to cause a problem in that the load of an administrative task is increased.

SUMMARY OF INVENTION

It is an object of the present invention to provide an information processing apparatus cooperating with a blockchain service. The information processing apparatus authenticates a user and confirms allocation of a specific role to the user to cause many users and/or apparatuses to use the blockchain service. In other words, the information processing apparatus functions as a hub device of the blockchain service.

An information processing apparatus according to an embodiment of the present invention cooperates with a management service that receives and stores electronic data via a network and a blockchain service that manages information about the stored electronic data in units of blocks and manages the multiple blocks in multiple nodes with association of each block with blocks before and after the block being defined. The information processing apparatus includes a storage unit that stores authentication information used in authentication of a user in association with role information indicating a privilege given to the user, a login unit that performs an authentication process upon reception of the authentication information and causes the user who is authenticated to log in the information processing apparatus and to use a function of the information processing apparatus in accordance with the role information that is confirmed, and a cooperation unit that provides the information about the stored electronic data to the blockchain service. The authenticated user is permitted to use the cooperation unit if it is confirmed that the role information indicating that a function to cooperate the blockchain service is available is included in the confirmed role information and the authenticated user is not permitted to use the cooperation unit if it is confirmed that the role information indicating that the function to cooperate with the blockchain service is unavailable is included in the confirmed role information.

Further features of the present invention will become apparent from the following description of exemplary embodiments with reference to the attached drawings.

DESCRIPTION OF EMBODIMENTS

First Embodiment

Figure 1:
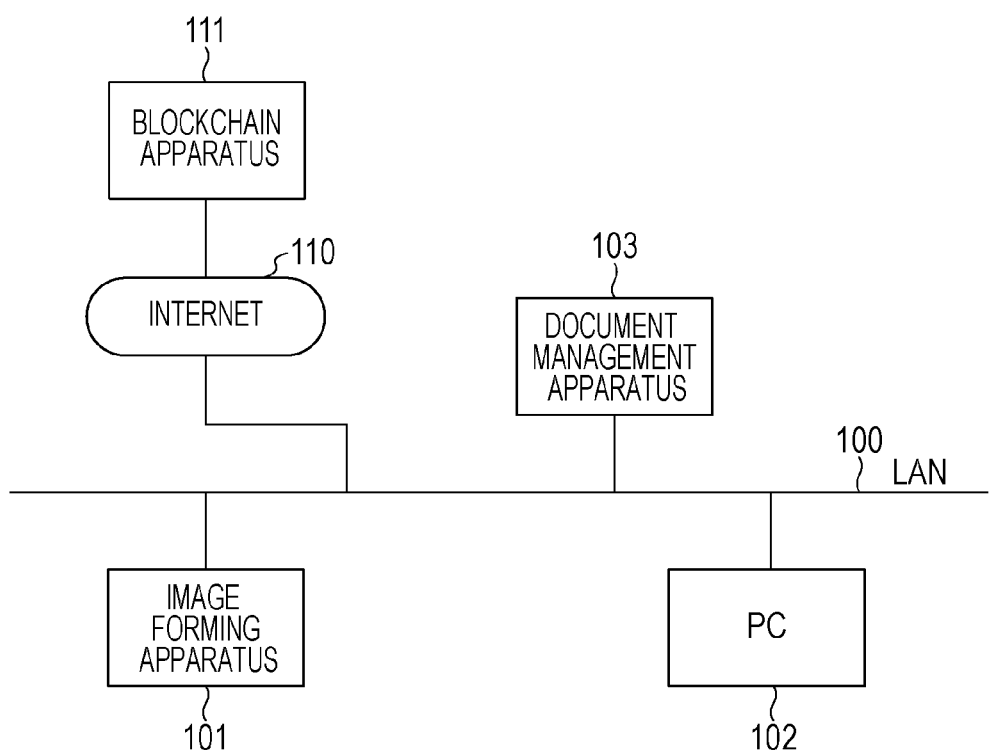
FIG. 1 is a diagram illustrating the configuration of a system.

Embodiments of the present invention will herein be described with reference to the drawings. FIG. 1 is an overall view of a system related to an image forming apparatus 101. The image forming apparatus 101, a personal computer (PC) 102, and a document management apparatus 103 exist in an intranet with being connected to a local area network (LAN) 100 and communicate with a blockchain apparatus 111 over the Internet 110. The PC 102 is used for management of the image forming apparatus 101 using a Web browser and for printing from the image forming apparatus 101 using a print driver.

The blockchain apparatus 111 is an apparatus that manages information about an electronic document generated in the image forming apparatus 101 or the PC 102 in units of blocks and is an apparatus that provides a blockchain service to ensure the validity of the document. The document management apparatus 103 is an apparatus that saves the electronic document generated in the image forming apparatus 101 or the PC 102 and provides a document management service.

Figure 2:
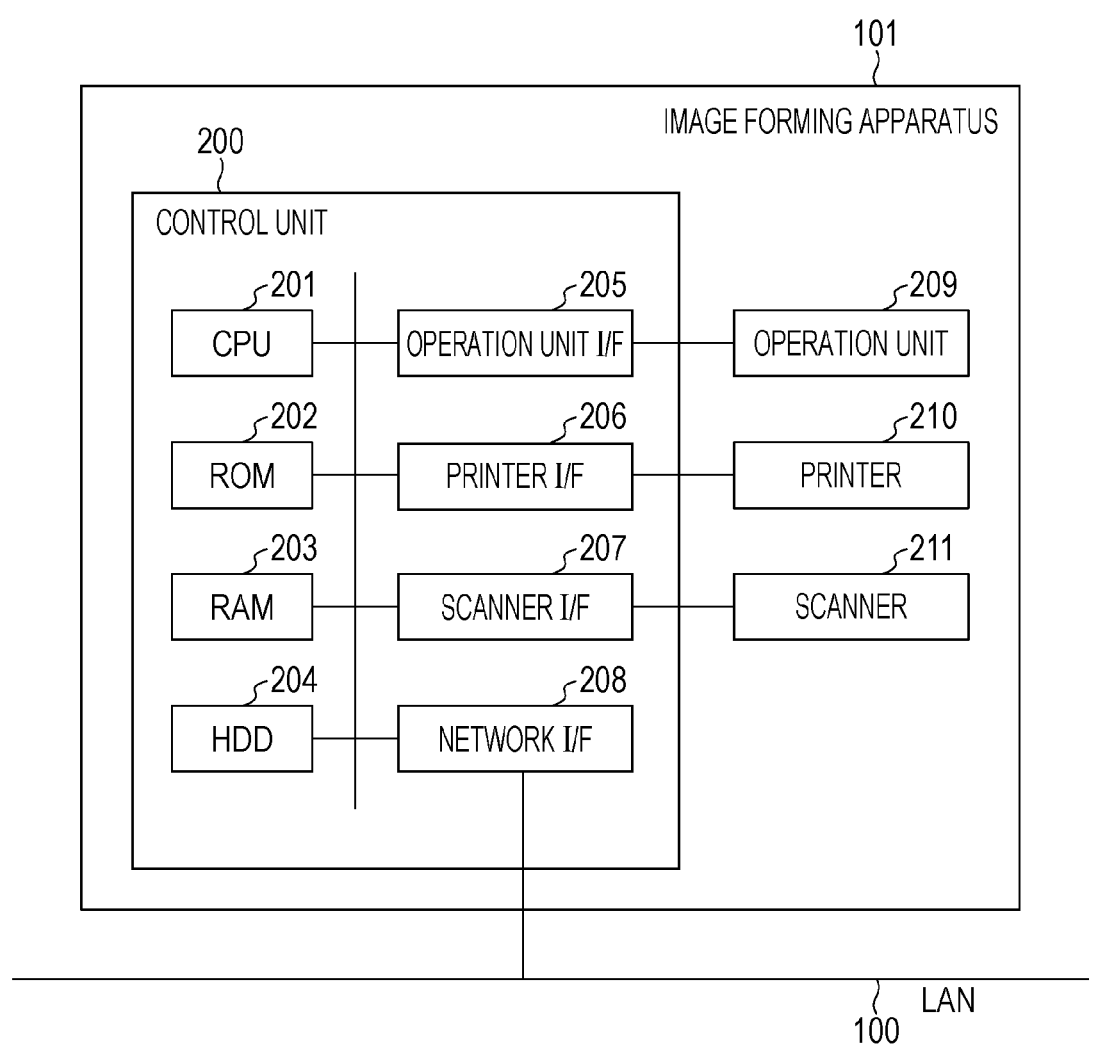
FIG. 2 is a diagram illustrating the hardware configuration of an image forming apparatus.

FIG. 2 is a block diagram illustrating the hardware configuration of the image forming apparatus 101. A control unit 200 including a central processing unit (CPU) 201 controls the entire operation of the image forming apparatus 101. The CPU 201 reads out control programs stored in a read only memory (ROM) 202 to perform a variety of control including readout control and transmission control. A random access memory (RAM) 203 is used as a temporary storage area, such as a main memory and a working area, of the CPU 201. A hard disk drive (HDD) 204 stores image data, various programs, or a variety of data described below. Although the image forming apparatus 101 has the hardware configuration as an information processing apparatus, the image forming apparatus 101 further has the following hardware configuration, in addition to the hardware configuration as the information processing apparatus.

An operation unit interface (I/F) 205 is used to connect the control unit 200 to an operation unit 209. A printer I/F 206 is used to connect the control unit 200 to a printer 210. The image data to be printed in the printer 210 is transferred from the control unit 200 to the printer 210 via the printer I/F 206 and is printed on a recording medium in the printer 210. A scanner I/F 207 is used to connect the control unit 200 to a scanner 211. The scanner 211 reads out an image of an original document to generate the image data and supplies the image data to the control unit 200 via the scanner I/F 207.

A network I/F 208 is used to connect the control unit 200 (the image forming apparatus 101) to the LAN 100. The image data or information is transmitted to an external apparatus on the LAN 100 via the network I/F 208 and a variety of information is received from the external apparatus on the LAN 100 via the network I/F 208.

Figure 3:
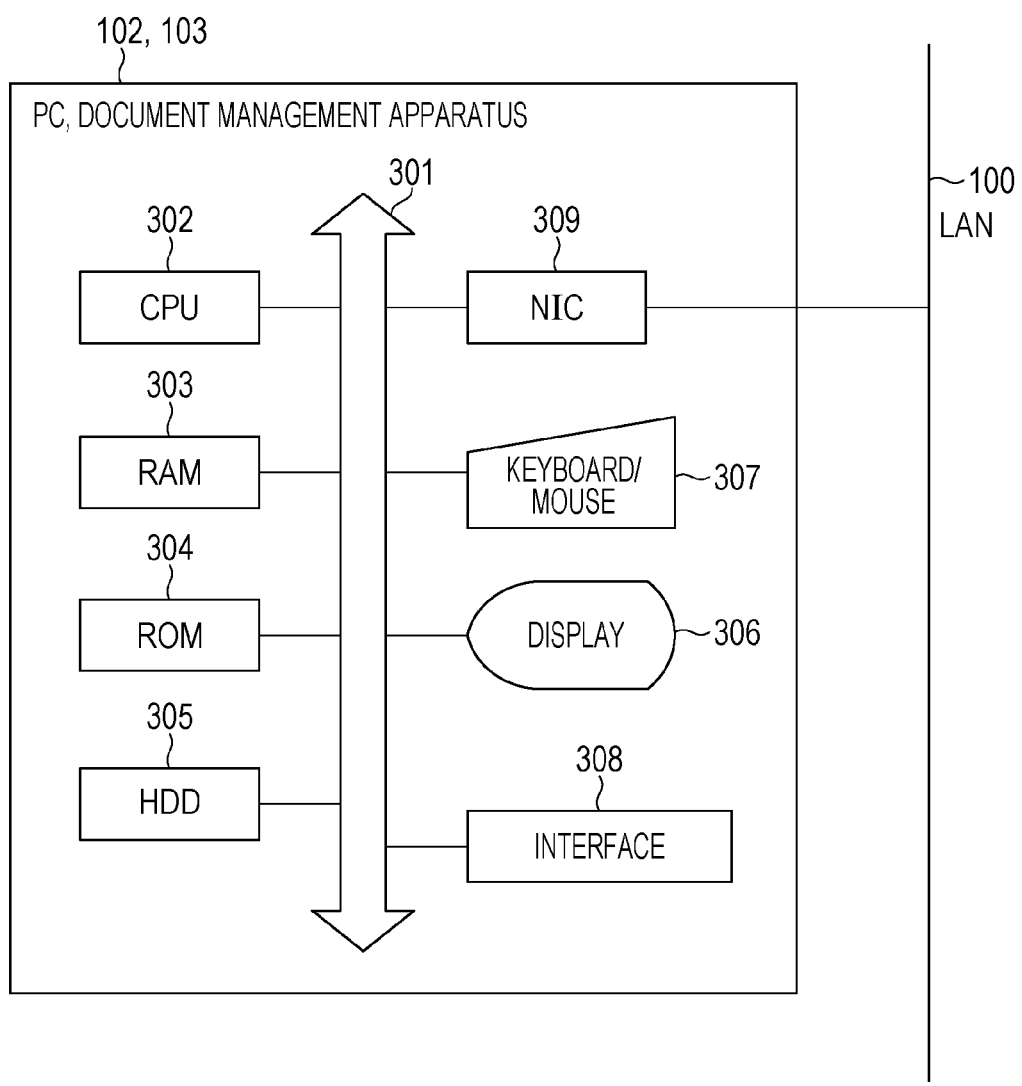
FIG. 3 is a diagram illustrating the hardware configuration of a PC and a document management apparatus.

FIG. 3 is a block diagram illustrating the hardware configuration of computers of the PC 102 and the document management apparatus 103. A CPU 302 controls the entire apparatus. The CPU 302 executes an application program, the operating system (OS), or the like stored in an HDD 305 to perform control so as to temporarily store information necessary to execute the program, files, and so on in a RAM 303. A ROM 304 is a storage unit and stores a variety of data including a basic input-output (I/O) program. The RAM 303 is a temporary storage unit and functions as a main memory, a working area, and so on of the CPU 302. The HDD 305 is one external storage unit, functions as a mass memory, and stores application programs, such as an office application and the Web browser, the OS, related programs, and so on.

A display 306 is a display unit and displays a command or the like input with a keyboard/mouse 307, which is an instruction input unit. An interface 308 is an external apparatus I/F and is used to connect the apparatus to a printer, a universal serial bus (USB) device, and/or a peripheral device. A system bus 301 is used to control the flow of data in the apparatus. A network interface card (NIC) 309 is used to exchange data with an external apparatus via the LAN 100.

The configuration of the information processing apparatus is an example and the examples of the configurations illustrated in FIG. 2 and FIG. 3 are not limitedly adopted. For example, the portion where the data and the programs are stored may be selected from the ROM 304, the RAM 303, the HDD 305, and so on depending on the features of the data and the programs. A variety of processing is realized by loading the corresponding program stored in the ROM 304 or the like into the RAM 303 or the like and executing the program by the CPU 302 unless otherwise specified in the present embodiment.

Figure 4:
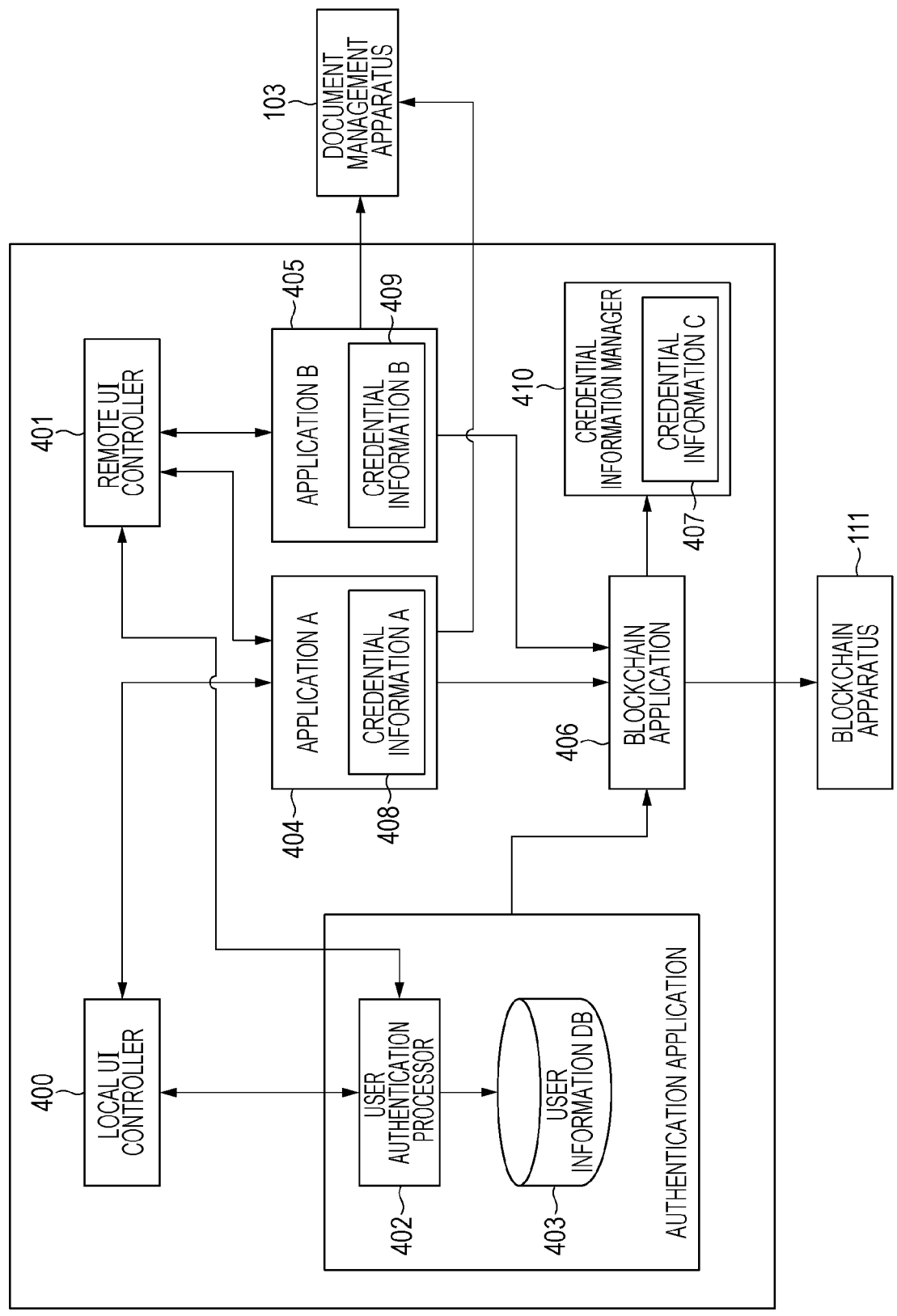
FIG. 4 is a diagram illustrating the software configuration of the image forming apparatus.
Figure 9A:
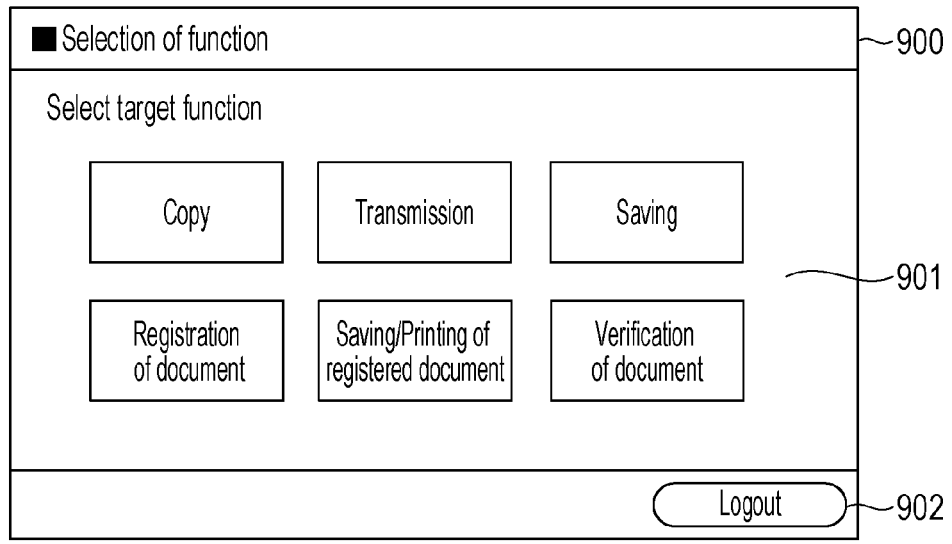
FIG. 9A is a screen example of a function selection screen.

FIG. 4 is a block diagram illustrating the software configuration related to the present invention in the image forming apparatus 101. Each processing unit is the control program stored in the ROM 202 unless otherwise specified. A local user interface (UI) controller 400 provides a function to control the operation unit 209 via the operation unit I/F 205. The local UI controller 400 notifies a user authentication processor 402 or an application of the contents of an operation by a user with the operation unit 209. The local UI controller 400 displays a function selection screen 900 in the operation unit 209. An example of the function selection screen 900 is illustrated in FIG. 9A. The local UI controller 400 performs control so as to display a screen in the operation unit 209 in response to a screen display request from the user authentication processor 402 or the application. The user authentication processor 402 and an application A 404 each displays a screen in the operation unit 209 via the local UI controller 400.

Figure 9B:
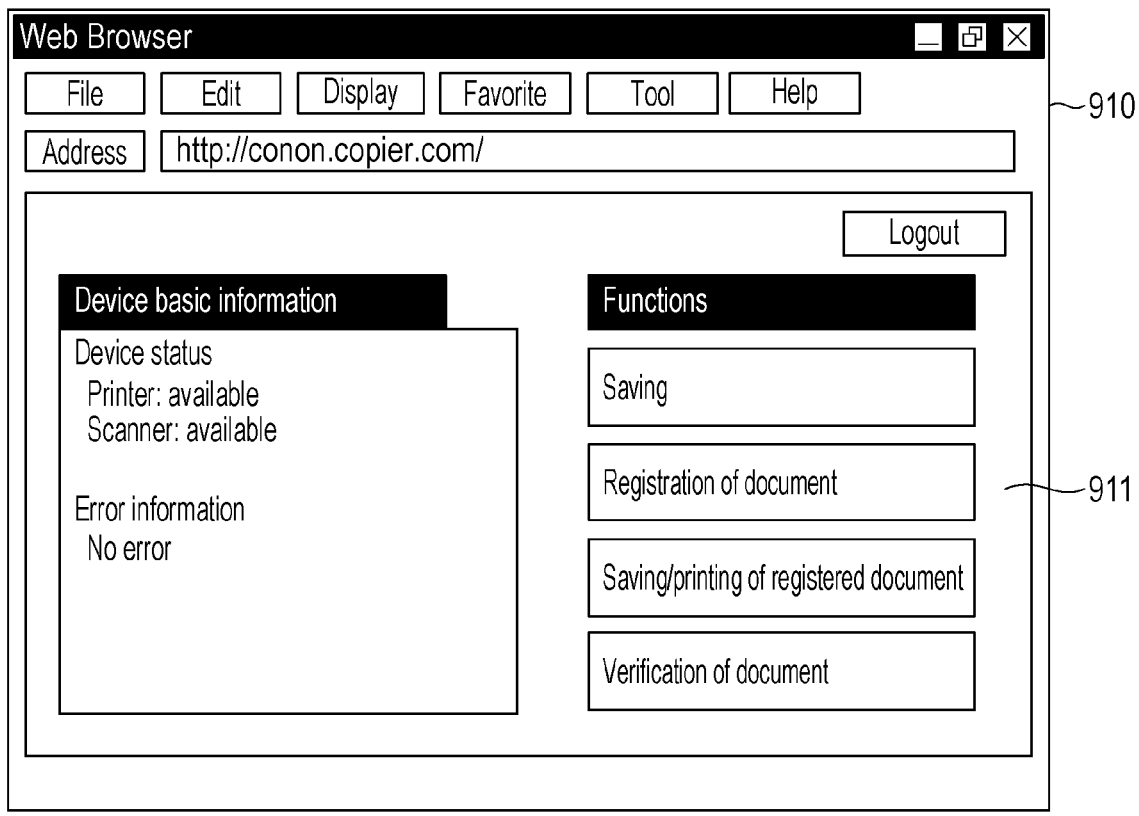
FIG. 9B is a screen example of the function selection screen.

A remote UI controller 401 provides a Web page to the Web browser on the PC 102 via the network I/F 208. The remote UI controller 401 notifies the user authentication processor 402 or an application of the contents of an operation by the user on the Web browser. The remote UI controller 401 displays a function selection screen 910 on the Web browser on the PC 102. An example of the function selection screen 910 is illustrated in FIG. 9B. The remote UI controller 401 performs control so as to display a Web page on the Web browser in response to a request from the user authentication processor 402 or the application. The user authentication processor 402, the application A 404, and an application B 405 causes the Web browser to display a Web page via the remote UI controller 401.

Figure 7A:
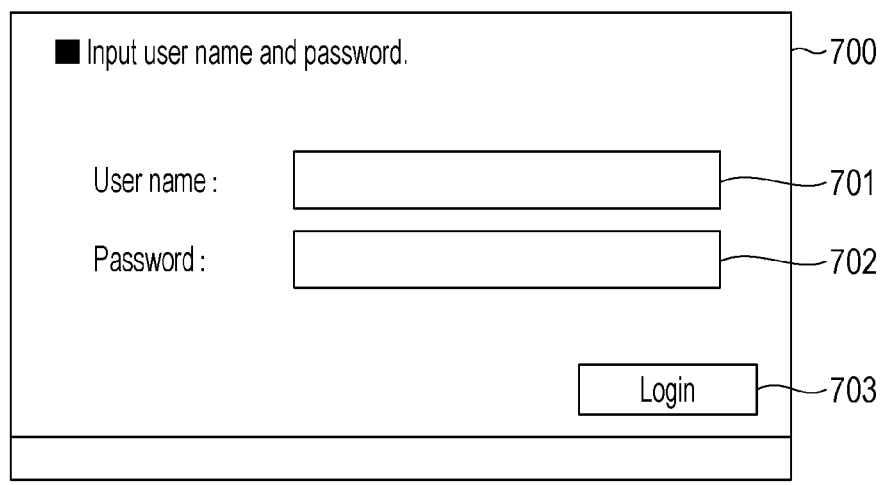
FIG. 7A is a screen example of an authentication screen.

The user authentication processor 402 provides a function to authenticate the user using the image forming apparatus 101. Accordingly, the user authentication processor 402 displays an authentication screen 700 (an example of the screen is illustrated in FIG. 7A) in the operation unit 209. The user authentication processor 402 receives authentication information including a user name and a password input by the user with the authentication screen 700 and compares the authentication information with user information held in a user information DB 403 for user authentication.

The user information DB 403 provides a function to hold the user information, which is information concerning the user using the image forming apparatus 101. The user information DB 403 is built in the HDD 204 and the information in the user information DB 403 is stored in the HDD 204. Examples of the information in the user information DB 403 are indicated in Table 1 and Table 2:

TABLE 1

User information table

| User name | Password | Role |
|---|---|---|
| User A | **** | Administrator |
| User B | **** | General User |
| Guest | — | Guest User |

A user information table in Table 1 is composed of "User name", "Password", and "Role" and the role is associated with the authentication information. "User name" is a name for uniquely identifying the user. "Password" is a password used in the user authentication and an arbitrary value may be set for each user as "Password". "Role" means the privilege of use of the image forming apparatus 101, which is given to the user of the image forming apparatus 101. Three roles: Administrator, General User, and Guest User exist in the present embodiment.

Administrator is the role allocated to a management user of the image forming apparatus 101, and General User is the role allocated to a general user using the image forming apparatus 101. Guest User is the role allocated to a user the available function of whom is intended to be restricted. Guest User is the role that is allocated to the user when the user uses the function without registering the authentication information including the user name and the password in the user information DB 403. Since the available function is determined based on the value of "Role" of the user who logs in the image forming apparatus 101, use of the functions of the image forming apparatus 101 is restricted for each role.

TABLE 2

Role information table

| Role | Copy | Transmission | Saving | BC registration | BC saving/printing | BC verification |
|---|---|---|---|---|---|---|
| Administrator | Permitted | Permitted | Permitted | Permitted | Permitted | Permitted |
| General User | Permitted | Inhibited | Permitted | Permitted | Permitted | Permitted |
| Guest User | Permitted | Inhibited | Inhibited | Inhibited | Inhibited | Permitted |

A role information table in Table 2 is composed of "Role", "Copy", "Transmission", "Saving", "BC registration", "BC saving/printing", and "BC verification". "Copy", "Transmission", "Saving", "BC registration", "BC saving/printing", and "BC verification" represent the respective functions of the image forming apparatus 101 and the values of them indicate whether use of the corresponding functions is permitted or inhibited for each role. "Copy", "Transmission", and "Saving" represent the privileges of a copy function, a scanning function to transmit a scanned document to the PC 102, and a function to save the scanned electronic document in the HDD 204, respectively.

"BC registration" represents the privilege of a function to register information about the document in the blockchain apparatus 111. "BC saving/printing" represents the privilege of a function to save in the image forming apparatus 101 or print the document that is associated with document information registered in the blockchain apparatus 111 and that is stored in the document management apparatus 103. "BC verification" represents the privilege of a function to verify whether the document is a valid document based on the document information registered in the blockchain apparatus 111. The applications in the image forming apparatus 101 restrict the respective functions in accordance with the privilege of the role in the role information table, which corresponds to the role of the user who logs in the image forming apparatus 101.

The roles, such as Administrator, are prepared in terms of the privilege level of the user in a first embodiment. However, for example, a role such as "BC role" and, more specifically, dedicated roles such as "BC registration role" and "BC saving/printing role" for using the blockchain service may be prepared.

The application A 404 provides a function to convert the scanned document into an electronic document and to register the information about the document in the blockchain apparatus 111 and register the document in the document management apparatus 103 via a blockchain application 406. The application A 404 provides a function to receive the registered document and to print the document via the printer I/F 206. The application A 404 controls the scanner 211 via the scanner I/F 207 and transmits the data to the LAN 100 via the network I/F 208 to transmit the scanned data to an external apparatus. The application A 404 supplies screen information to the local UI controller 400 and the remote UI controller 401.

Figure 10A:
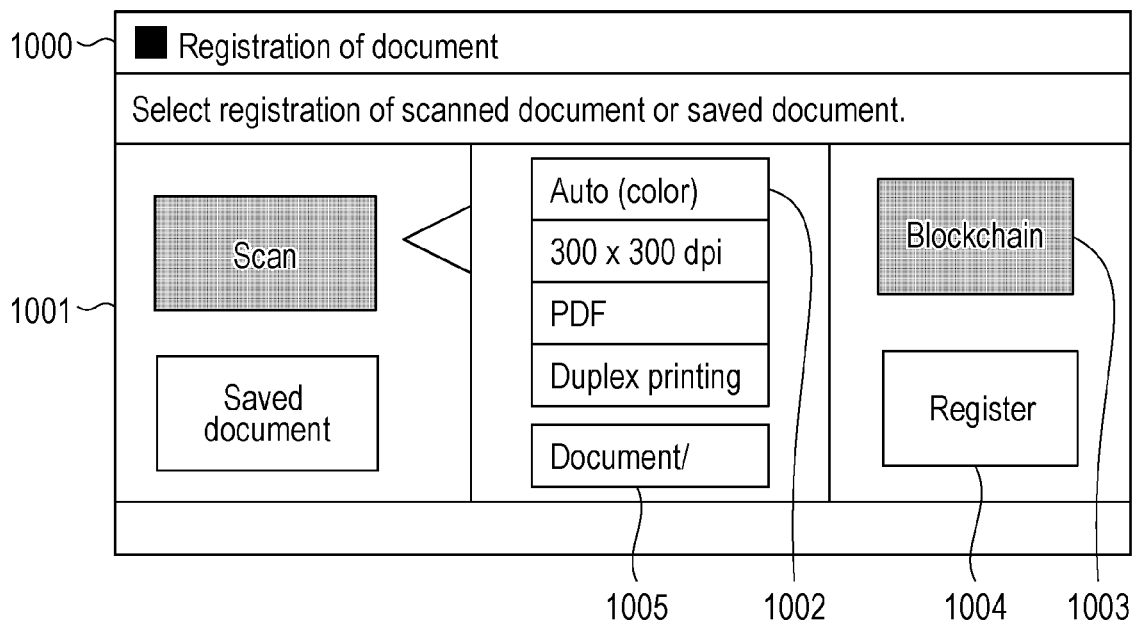
FIG. 10A is a screen example of a document registration screen of an application A.
Figure 11A:
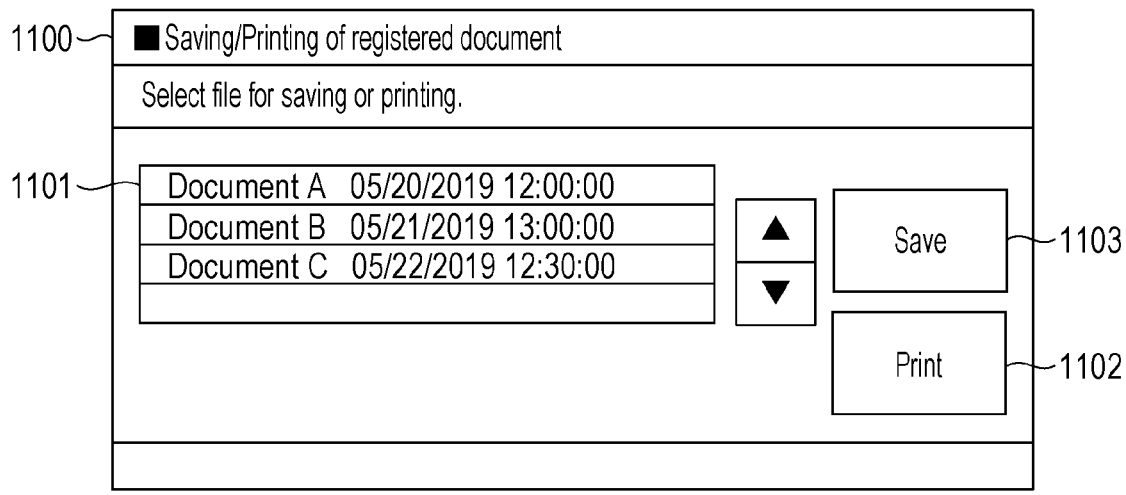
FIG. 11A is a screen example of a saving/printing-of-registered-document screen of the application A.
Figure 12A:
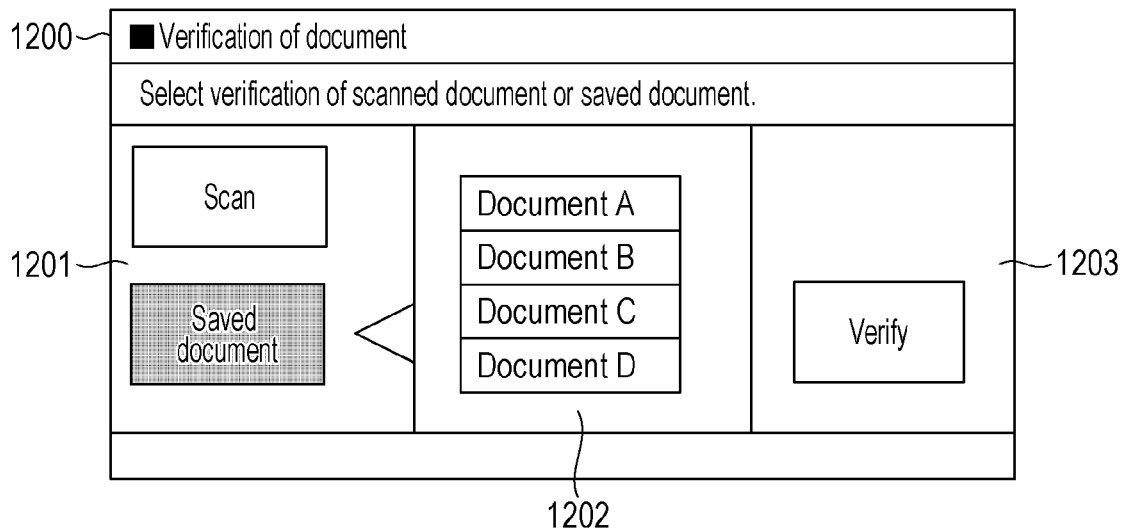
FIG. 12A is a screen example of a verification-of-registered-document screen of the application A.

The application A 404 accepts an input on a screen displayed in the operation unit 209 via the local UI controller 400 and performs processing corresponding to the input. The application A 404 displays a registration screen 1000, a saving/printing-of-registered-document screen 1100, and a verification screen 1200 in the operation unit 209. An example of the registration screen 1000 is illustrated in FIG. 10A, an example of the saving/printing-of-registered-document screen 1100 is illustrated in FIG. 11A, and an example of the verification screen 1200 is illustrated in FIG. 12A.

Figure 10C:
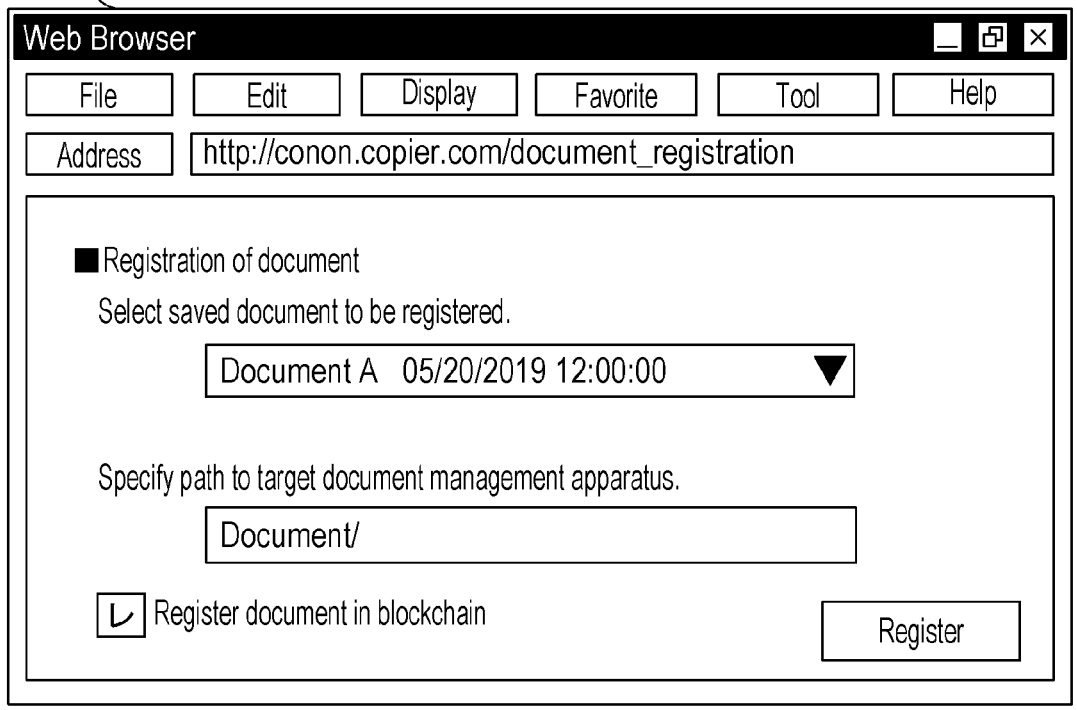
FIG. 10C is a screen example of the document registration screen of the application A.
Figure 11B:
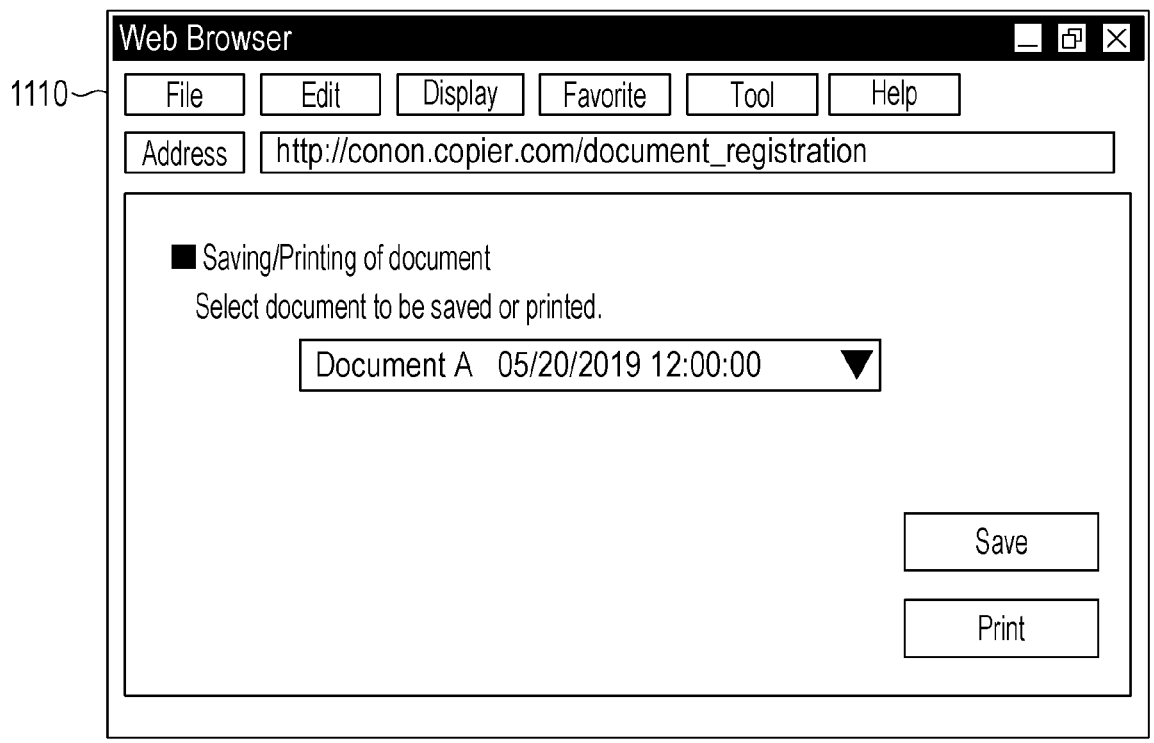
FIG. 11B is a screen example of the saving/printing-of-registered-document screen of the application A.
Figure 12B:
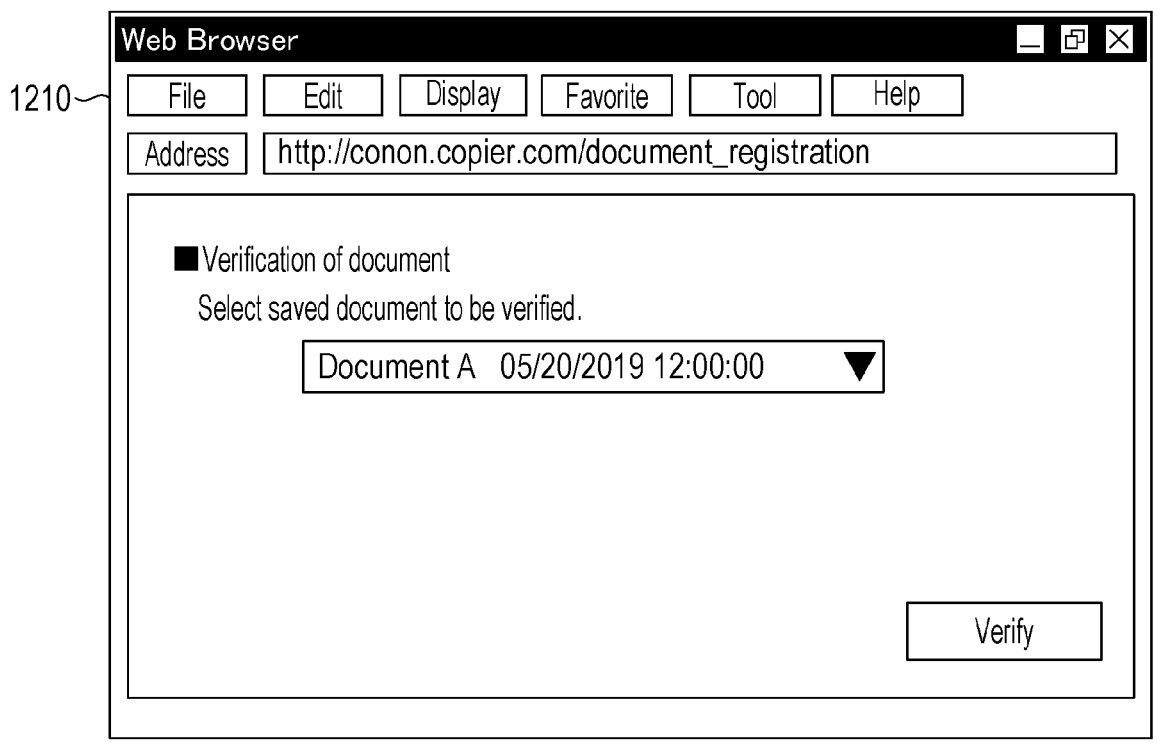
FIG. 12B is a screen example of the verification-of-registered-document screen of the application A.

In addition, the application A 404 accepts an input on the Web browser on the PC 102 via the remote UI controller 401 and performs processing corresponding to the input. The application A 404 displays a registration screen 1020, a saving/printing-of-registered-document screen 1110, and a verification screen 1210 on the Web browser on the PC 102. An example of the registration screen 1020 is illustrated in FIG. 10C, an example of the saving/printing-of-registereddocument screen 1110 is illustrated in FIG. 11B, and an example of the verification screen 1210 is illustrated in FIG. 12B.

Although the example is described in which one application has the functions including the registration of a document, the printing, and the verification, the functions may be shared between multiple applications. For example, a mode may be supposed in which a scanning application performing the registration of a document and a print application performing the printing are prepared.

The application B 405 provides the function to convert the scanned document into an electronic document and to register the information about the document in the blockchain apparatus 111 and register the document in the document management apparatus 103 via the blockchain application 406, like the application A 404. The application B 405 supplies the screen information to the remote UI controller 401. Although the application A 404 supports input-output from both a local UI and a remote UI via the local UI controller 400 and the remote UI controller 401, the application B 405 differs from the application A 404 in that the application B 405 supports input-output only from the remote UI. The application A 404 and the application B 405 do not directly communicate with the blockchain apparatus 111.

Figure 6:
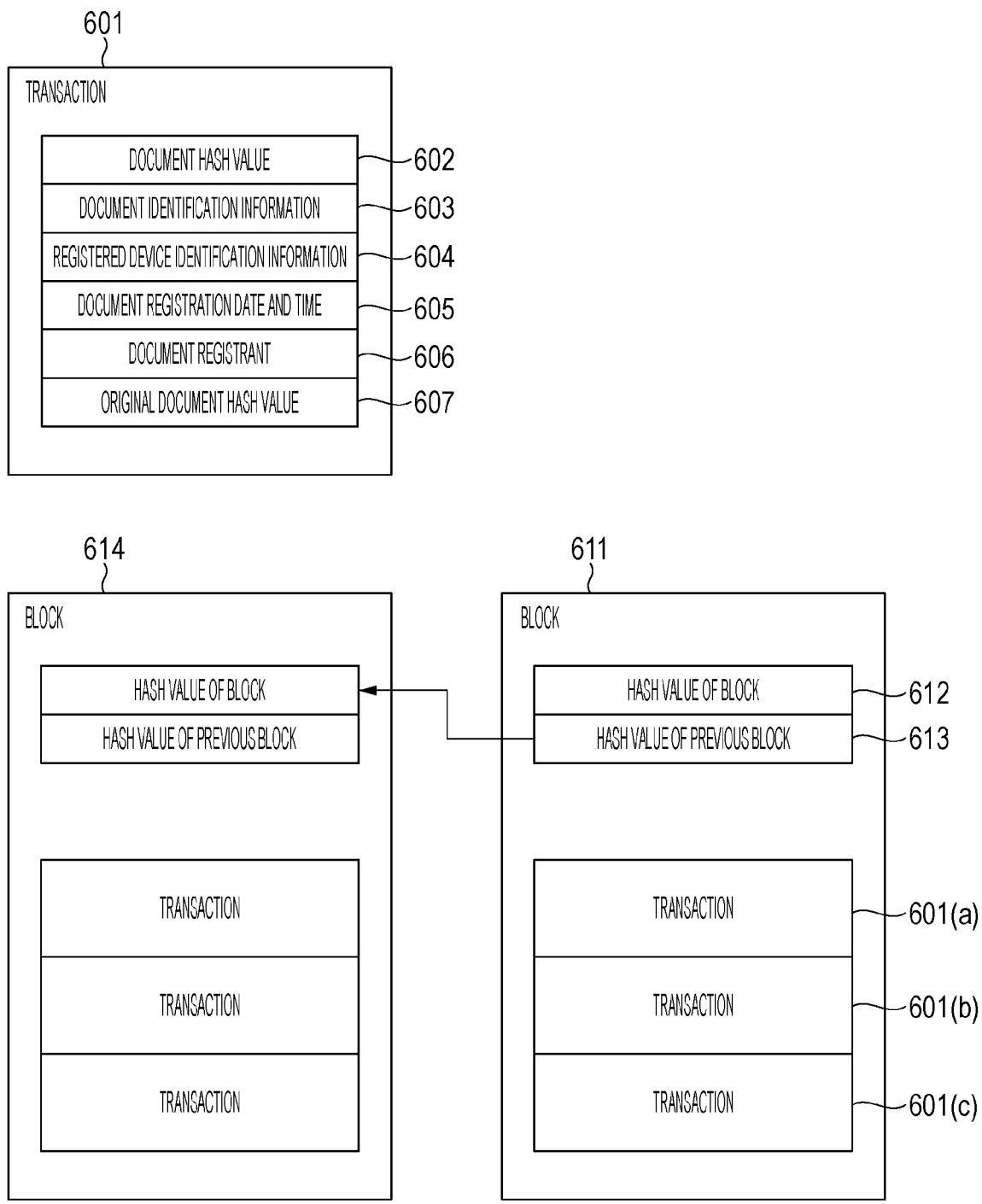
FIG. 6 is a diagram illustrating the data structure of a blockchain apparatus.

The blockchain application 406 is an application for blockchain cooperation and provides a function to register in the blockchain apparatus 111, acquire, and verify the information about the document in response to an instruction from the application A 404 or the application B 405. An example of a transaction 601 registered in the blockchain apparatus 111 by the blockchain application 406 and the data structure of blocks is illustrated in FIG. 6. This will be described in detail below with reference to FIG. 6.

When the blockchain application 406 receives an instruction for the blockchain apparatus 111 from the application, the blockchain application 406 also receives credential information from a credential information manager 410. The blockchain application 406 verifies the received credential information and performs processing for the blockchain apparatus 111 only if the verification succeeded.

Credential information A 408 is the credential information to ensure that the application A 404 is an authorized application for using the blockchain apparatus 111. The credential information A 408 is issued for the application for which execution of the appropriate processing is verified and the application is installed in the image forming apparatus 101 in a state in which the credential information is incorporated in the application.

Credential information B 409 is the credential information to ensure that the application B 405 is an authorized application for using the blockchain apparatus 111. The credential information B 409 is installed in the image forming apparatus 101, in the same manner as in the credential information A 408.

Credential information C 407 is the credential information to ensure that the image forming apparatus 101 is an authorized apparatus for using the blockchain apparatus 111. The credential information C 407 may be issued, for example, for each maker of the apparatus by an organization administering the system. The credential information C 407 may be shipped in a state in which the credential information C 407 is incorporated in the firmware of the image forming apparatus 101 or may be installed in the image forming apparatus 101 after shipment.

The credential information may be a digital certificate, a key pair of a private key and a public key, or a predetermined data value. The mode of the credential information is not restricted. Different applications may have different modes of the credential information.

The credential information manager 410 provides a function to manage the credential information in the image forming apparatus 101. In the present embodiment, the credential information manager 410 passes the credential information C 407 to the blockchain application 406 in response to an instruction from the blockchain application 406. Although the PC 102 cooperates with the blockchain apparatus 111 via the image forming apparatus 101 in the first embodiment, the credential information manager 410 configures the credential information C 407 so as not to be supplied to the PC 102. Since the user of the PC 102 logs in the PC 102 via the remote UI and use of the blockchain application 406 by the user of the PC 102 is permitted based on the role confirmed by the image forming apparatus 101, the PC 102 may not establish confidential relationship with the blockchain apparatus 111 in advance.

Figure 5:
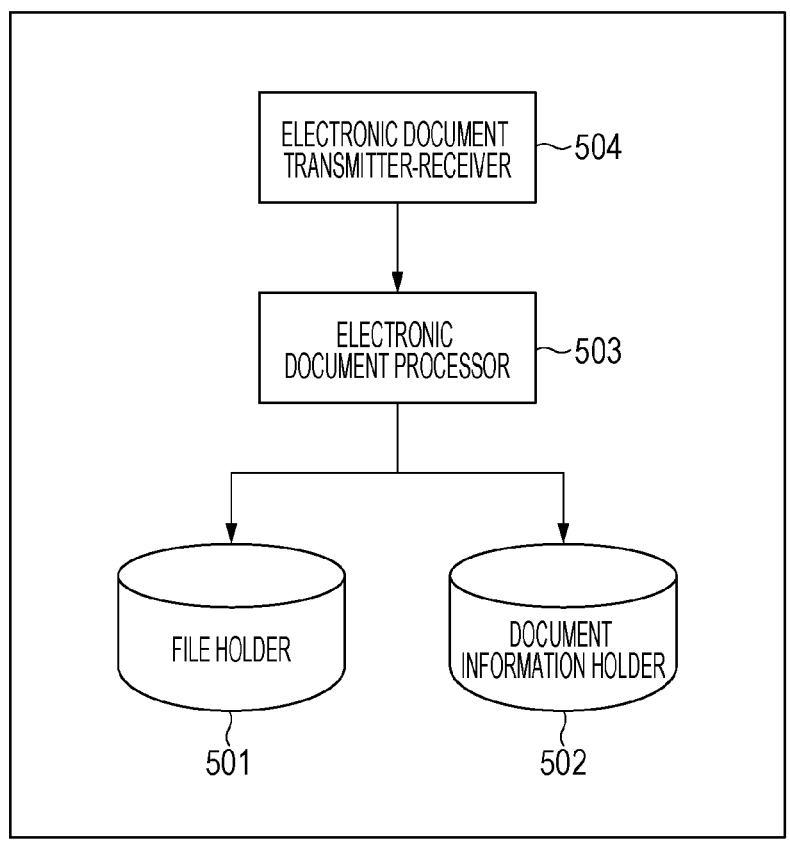
FIG. 5 is a diagram illustrating the software configuration of the document management apparatus.

FIG. 5 is a block diagram illustrating the software configuration related to the present invention in the document management apparatus 103. The electronic document managed by the document management apparatus 103 is composed of a document file to be saved in a file holder 501 and information representing each document to be saved in a document information holder 502. Data to be stored in the document information holder 502 is the information described in a document information table in Table 3:

TABLE 3

| ID | Document name | Registration date and time | File path |
|---|---|---|---|
| 1 | Document A | May 20, 2019 12:00:00 | D: ¥Document¥document0001.pdf |
| 2 | Document B | May 21, 2019 13:00:00 | D: ¥Document¥document0002.pdf |
| 3 | Document C | May 22, 2019 12:30:00 | D: ¥Document¥document0003.pdf |

The document information table in Table 3 is composed of "ID", "Document name", "Registration date and time", and "File path". "ID" is identification information for uniquely managing the electronic document. "Document name" is a name given to the electronic document so that the user identifies the electronic document. Multiple electronic documents may have the same document name. "Registration date and time" indicates the date and time when the electronic document is saved in the document management apparatus 103. "File path" indicates the position where the document file stored in the file holder 501 is saved. Although "File path" is indicated as a path on a file system in the present embodiment, information other than the path may be used as long as the information uniquely represents the saving location.

Although the document information table is composed of the minimum items necessary to describe the first embodiment, for example, information for classifying the documents may also be held in the document information table. An electronic document processor 503 has a function to access the file holder 501 and the document information holder 502 to control processing including registration and acquisition of the electronic document and acquisition of a list. The processing in the electronic document processor 503 is performed upon activation by an electronic document transmitter-receiver 504 that has accepted a request for input-output of the electronic document, which is received from the outside of the document management apparatus 103, such as the image forming apparatus 101 or the PC 102.

FIG. 6 is a block diagram illustrating the transaction 601 and the data structure of the blocks each storing multiple transactions, which are held in the blockchain apparatus 111. The blockchain apparatus 111 is an apparatus that manages the data in a method called blockchain. The blockchain handles information in units of transactions and manages the information in units of blocks each including the multiple transactions.

Association of each block with the blocks before and after the block is defined to keep a state in which the respective blocks are stringed. The blockchain is managed in multiple computers called nodes and has a decentralized apparatus structure in which the respective nodes manage block data in the same manner. Accordingly, it is necessary to update the multiple nodes composing the blockchain in tampering of the block data and, thus, the blockchain is known as a data management method having a high anti-tampering feature. Although the term of the blockchain apparatus 111 is used, the blockchain apparatus 111 is an apparatus composed of the multiple computers, as described above, and the blockchain service is provided by the multiple computers.

In the present embodiment, in processing of the electronic document in the image forming apparatus 101, the transactions representing the document are transmitted to the blockchain apparatus 111 and the transactions are managed in the blocks to keep the correct state of the electronic document. This enables confirmation of whether tampering is performed to the electronic document in the document management apparatus 103.

The transaction 601 representing registration of the electronic document in the document management apparatus 103 and output of the electronic document from the document management apparatus 103 includes the following six pieces of information. A document hash value 602 is a hash value calculated to uniquely represent the target electronic document. The document hash value 602 is calculated from the entire document file, and the value calculated for the document hash value 602 is varied upon modification of the electronic document itself. However, a calculation method other than the above one may be adopted.

Document identification information 603 is information that is held for association with the electronic document managed in the document management apparatus 103, and the ID value in Table 3 is stored as the document identification information 603 in the present embodiment. Registered device identification information 604 is information that identifies the image forming apparatus 101 that has performed the registration of the document, and the hash value in the credential information C 407 is stored as the registered device identification information 604 in the present embodiment. A document registration date and time 605 is information indicating the time when the document has been registered, and the value of the registration date and time in Table 3 is stored as the document registration date and time 605 in the present embodiment.

A document registrant 606 is information indicating the user who has performed the registration of the document, and the hash value of the user name of the user who has logged in the image forming apparatus 101 is stored as the document registrant 606 in the present embodiment. Since the information, such as the user name, which has been registered to use the image forming apparatus 101, is capable of being used as the information to be registered in the blockchain apparatus 111, it is possible to reduce the load of an administrative task on a system manager. An original document hash value 607 is information indicating the relation between the documents. When printing, storage of electronic data, or the like is performed to the electronic document stored in the document management apparatus 103, the original document hash value 607 is used for association with the original electronic document.

Next, the structure of the block holding the transaction 601 will be described using a block 611. The block 611 schematically illustrates a general blockchain structure. The transaction 611 holds multiple transactions 601(*a*) to 601(*c*) and a hash value of block 612 calculated from the transactions 601.

Although the three transactions 601 are included in the block in the first embodiment, the number of the transactions is not restricted. In addition, the block 611 holds a hash value of previous block 613 for connection between the blocks. In the first embodiment, the hash value of the block of a block 614 is stored in the hash value of previous block 613 to indicate that the block 614 is associated with the block 611. Although the hash value of previous block is held in the first embodiment, a mode may be adopted in which the hash value of the subsequent block is managed or in which the hash values of both the previous block and the subsequent block are managed.

Figure 7B:
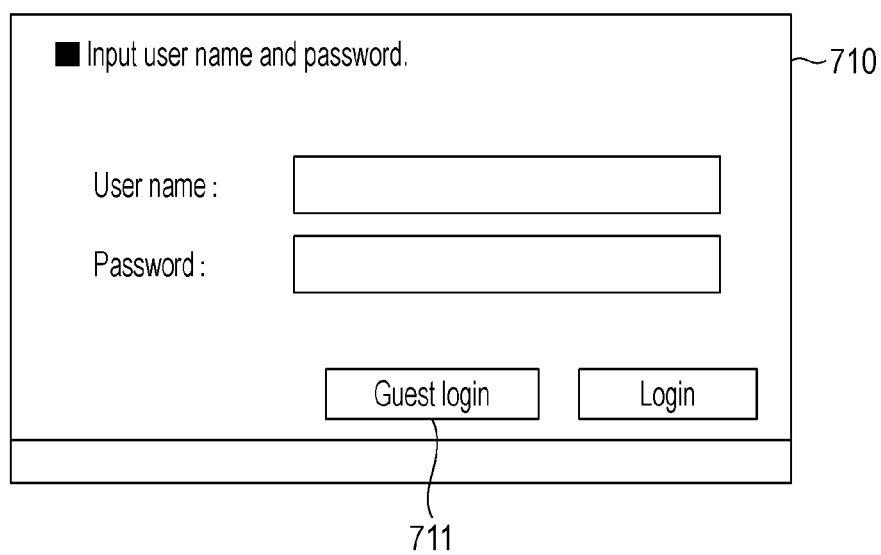
FIG. 7B is a screen example of the authentication screen.

FIG. 7A and FIG. 7B are screen examples of authentication screens. The authentication screen 700 in FIG. 7A is a screen for providing a function to perform the user authentication in order for the user to use the function of the image forming apparatus 101. A user name input field 701 is a field used by the user of the image forming apparatus 101 to input the user name. A password input field 702 is a field used by the user of the image forming apparatus 101 to input the password.

A Login button 703 is a button to perform the user authentication. When the user touches this button, the user authentication processor 402 performs the user authentication based on the values input in the user name input field 701 and the password input field 702.

An authentication screen (guest login) 710 in FIG. 7B is a screen example of the authentication screen including guest login and is a screen for providing the function to perform the user authentication in order for the user to use the function of the image forming apparatus 101. Only the difference between the authentication screen (guest login) 710 and the authentication screen 700 will be described here.

A Guest login button 711 is a button used to perform the user authentication as a guest user. When the user touches this button, the user authentication processor 402 permits login without performing the authentication using the user name and the password. In the case of the user who touches the Guest login button 711 to log in the image forming apparatus 101, the user name is Guest and his/her role is Guest User. The functions which the user can use are restricted in accordance with the privileges in the role information table in Table 2. Although a detailed description is omitted in the present embodiment, display of the authentication screen 700 and the authentication screen (guest login) 710 may be switched based on a setting set in the user authentication processor 402.

Figure 8A:
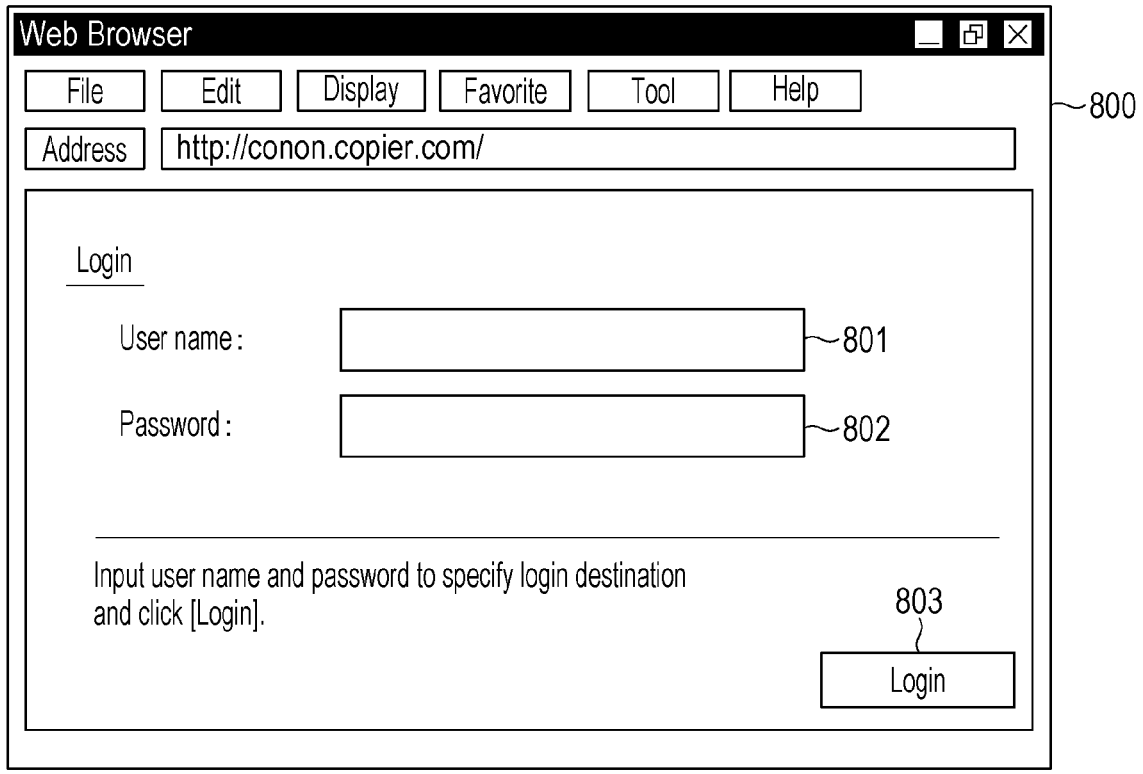
FIG. 8A is a screen example of a remote authentication screen.
Figure 8B:
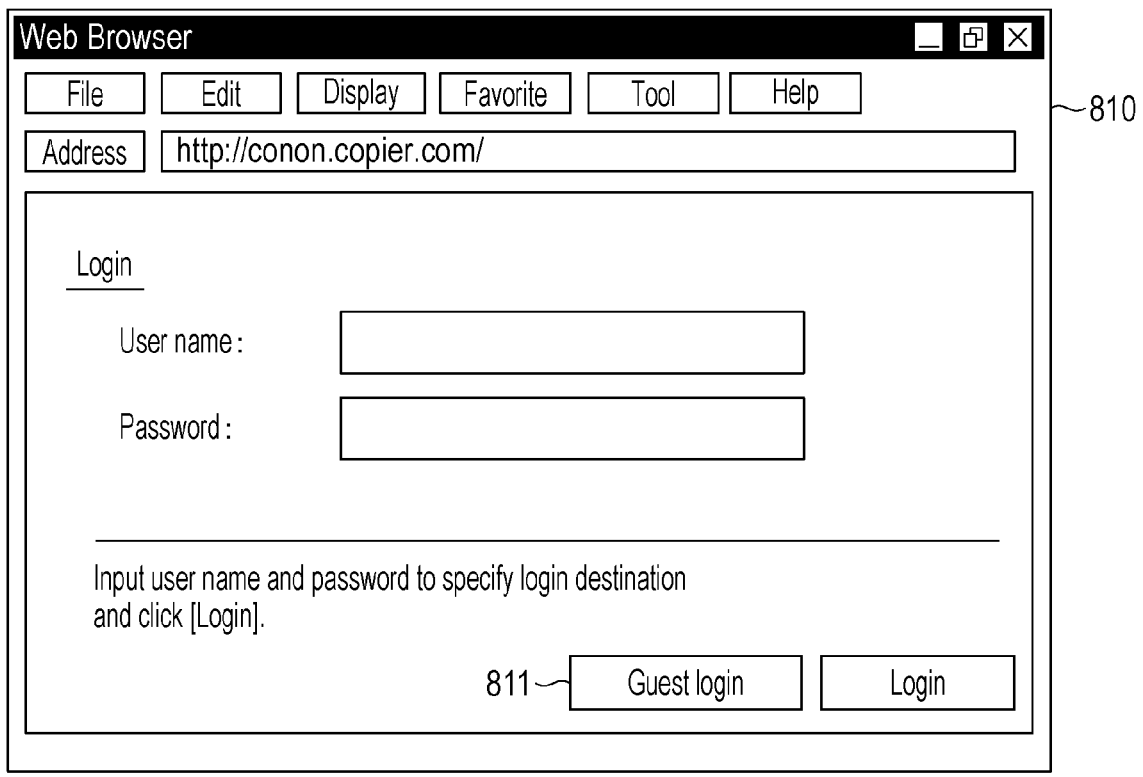
FIG. 8B is a screen example of the remote authentication screen.

FIG. 8A and FIG. 8B are screen examples of remote authentication screens. A remote authentication screen 800 in FIG. 8A is a screen for performing the user authentication in order for the user to use the function of the image forming apparatus 101 from the Web browser on the PC 102. A user name input field 801 is a field used by the user of the image forming apparatus 101 to input the user name. A password input field 802 is a field used by the user of the image forming apparatus 101 to input the password.

A Login button 803 is a button to perform the user authentication. When the user touches this button, the user authentication processor 402 performs the user authentication based on the values input in the user name input field 801 and the password input field 802.

A remote authentication screen (guest login) 810 in FIG. 8B is a screen for providing the function to perform the user authentication in order for the user to use the function of the image forming apparatus 101. Only the difference between remote authentication screen (guest login) 810 and the remote authentication screen 800 will be described here.

A Guest login button 811 is a button used to perform the user authentication as the guest user. When the user touches this button, the user authentication processor 402 permits login without performing the authentication using the user name and the password. In the case of the user who touches the Guest login button 811 to log in the image forming apparatus 101, the user name is Guest and his/her role is Guest User. The functions which the user can use are restricted in accordance with the privileges in the role information table in Table 2.

Although a detailed description is omitted in the present embodiment, display of the remote authentication screen 800 and the remote authentication screen (guest login) 810 may be switched based on a setting set in the user authentication processor 402.

FIG. 9 includes screen examples of screens for selection from the functions, which are displayed by the local UI controller 400 and the remote UI controller 401. A list of the functions installed in the image forming apparatus 101 is displayed on the screens for selecting the function, illustrated in FIG. 9. The user of the image forming apparatus 101 touches a button displayed on the screens to use the corresponding function installed in the image forming apparatus 101.

The function selection screen 900 in FIG. 9A is a screen displayed in the operation unit 209 by the local UI controller 400 immediately after the user logs in the image forming apparatus 101 on the authentication screen 700 or the authentication screen (guest login) 710. Function selection buttons 901 are buttons to use the respective functions of the image forming apparatus 101.

A Copy button is a button to display a screen for using the copy function, a Transmission button is a button to display a screen for using a function to transmit the scanned document to the PC 102, and a Saving button is a button to display a screen for using a function to save the scanned document in the HDD 204. Although a description of the screens displayed after the respective buttons are touched is omitted in the first embodiment, the screens are displayed in a manner in related art.

When a Registration of document button is touched, the registration screen 1000 or a registration screen 1010 is displayed. When a Saving/Printing of registered document button is touched, the saving/printing-of-registered-document screen 1100 is displayed. When a Verification of document button is touched, the verification screen 1200 is displayed.

A Logout button 902 is a button to perform a logout process displayed during login. When this button is touched, the logout process is performed and, then, the authentication screen 700 or the authentication screen (guest login) 710 is displayed.

The function selection screen 910 in FIG. 9B is an example of the screen displayed on the Web browser on the PC 102 by the remote UI controller 401 immediately after the user logs in the image forming apparatus 101 on the remote authentication screen 800 or the remote authentication screen (guest login) 810.

Function selection buttons 911 are buttons to use the respective functions. A description of the screen displayed after the Saving button is touched is omitted herein, as in the function selection screen 900. When the Registration of document button is touched, the registration screen 1020 or a registration screen 1030 is displayed. When the Saving/Printing of registered document button is touched, the saving/printing-of-registered-document screen 1110 is displayed. When the Verification of document button is touched, the verification screen 1210 is displayed.

The selection of the functions is not limited to this mode. For example, a mode may be adopted in which the application A 404 is displayed on the function selection screen 900 and the function, such as the registration or the printing, is selected after the application A 404 is selected on the function selection screen 900.

FIG. 10A, FIG. 10B, FIG. 10C, and FIG. 10D are screen examples of the registration screens displayed by the application A 404 and the application B 405. In the first embodiment, the application A 404 displays the screens in the operation unit 209 and on the Web browser on the PC 102 via the local UI controller 400 and the remote UI controller 401, respectively, and the application B 405 displays the screen only on the Web browser on the PC 102. The application B 405 may display the screens both in the operation unit 209 and on the Web browser on the PC 102.

The registration screen 1000 in FIG. 10A is a screen for providing a function to register the document in the blockchain apparatus 111 and the document management apparatus 103. Document selection settings 1001 are settings used to select a registration target document from scanned paper documents or documents saved in the image forming apparatus 101. Either of Scan or Saved document is selected from the document selection settings 1001. Scanning settings 1002 are various settings concerning scanning.

A Blockchain button 1003 is a button to select registration of the information about the document in the blockchain apparatus 111. The information about the document is registered in the blockchain apparatus 111 when the Blockchain button 1003 is selected and the information about the document is not registered in the blockchain apparatus 111 when the Blockchain button 1003 is not selected.

A Register button 1004 is used to perform the scanning of the document to create the electronic document when Scan is selected from the document selection settings 1001. When Saved document is selected, the list of the saved documents is displayed and the document selected from the list by the user is acquired. Then, when the Blockchain button 1003 is selected, the electronic document is registered in the document management apparatus 103 and the information about the electronic document is registered in the blockchain apparatus 111. When the Blockchain button 1003 is not selected, the electronic document is registered in the document management apparatus 103 and the information about the electronic document is not registered in the blockchain apparatus 111. A saving destination setting 1005 is a setting to specify which path of the document management apparatus 103 the document is to be saved on.

Figure 10B:
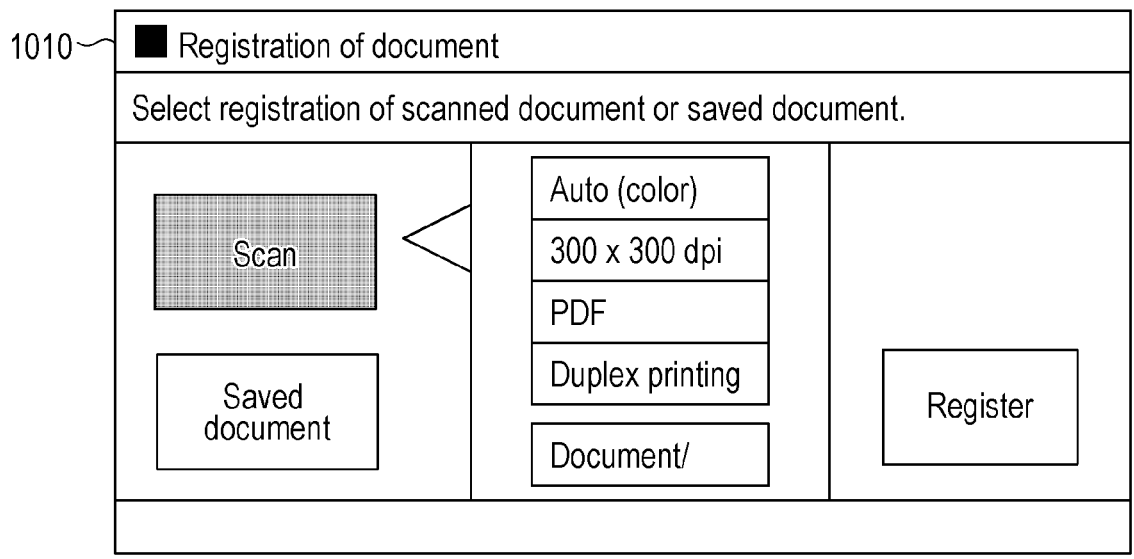
FIG. 10B is a screen example of the document registration screen of the application A.

The registration screen 1010 in FIG. 10B is a screen for providing a function to register the document in the document management apparatus 103 and, for example, is a screen displayed for the user who has logged in the image forming apparatus 101 as the guest user. Since the guest user does not have the privilege to register the document information in the blockchain apparatus 111 in the first embodiment, the registration screen 1010 differs from the registration screen 1000 in that the Blockchain button 1003 is not displayed on the registration screen 1010. When the role to use the blockchain service is not allocated to the user, the registration screen 1010 in FIG. 10B may be displayed.

The registration screen 1020 in FIG. 10C is a screen for providing the function to register the document in the blockchain apparatus 111 and the document management apparatus 103 and is an example of the screen displayed on the Web browser on the PC 102.

Figure 10D:
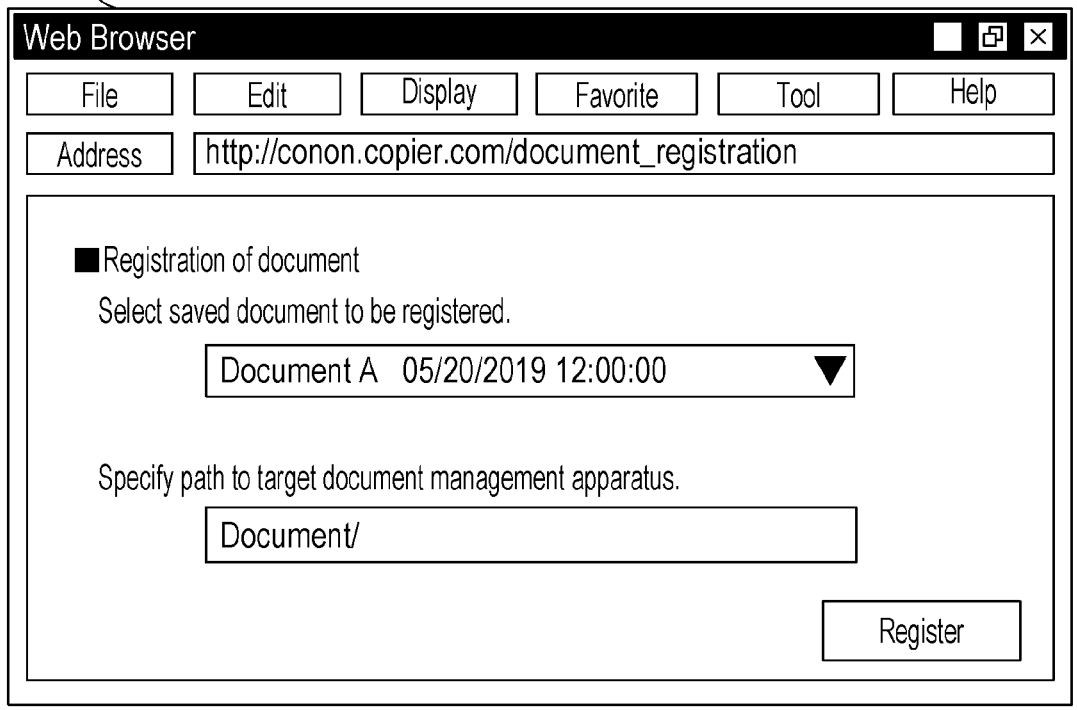
FIG. 10D is a screen example of the document registration screen of the application A.

The registration screen 1030 in FIG. 10D is a screen for providing the function to register the document in the document management apparatus 103 and, for example, is a screen displayed for the user who has logged in the image forming apparatus 101 as the guest user. When the role to use the blockchain service is not allocated to the user, the registration screen 1030 in FIG. 10D may be displayed.

FIG. 11A and FIG. 11B are screen examples of the screens which are displayed by the application A 404 and in which the registered document is saved or printed. The saving/printing-of-registered-document screen 1100 in FIG. 11A is a screen for providing a function to save or print the document managed in the blockchain apparatus 111 and the document management apparatus 103.

A document selection list 1101 is a list from which the document to be saved or printed is selected. The application A 404 displays the documents managed in the document management apparatus 103 in the document selection list 1101. A Print button 1102 is a button used to print the document selected from the document selection list 1101. A Save button 1103 is a button used to save the document selected from the document selection list 1101 in the HDD 204 in the image forming apparatus 101.

The saving/printing-of-registered-document screen 1110 in FIG. 11B is a screen for providing the function to save or print the document managed in the blockchain apparatus 111 and the document management apparatus 103 and is an example of the screen displayed on the Web browser on the PC 102.

FIG. 12A and FIG. 12B are screen examples of the screens for verification of the document, which are displayed by the application A 404. The verification screen 1200 in FIG. 12A is a screen for providing a function to verify whether the scanned document or the document saved in the image forming apparatus 101 is a valid document using the blockchain apparatus 111.

Document selection settings 1201 are settings used to select a verification target document from the scanned paper documents or the documents saved in the image forming apparatus 101. A document selection list 1202 is a list from which the verification target document is selected and is a list of the documents saved in the HDD 204. A Verify button 1203 is a button used to perform the scanning of the document and, then, verify the document using the blockchain apparatus 111 when Scan is selected from the document selection settings 1201. The Verify button 1203 is used to verify the document selected from the document selection list 1202 when Saved document is selected from the document selection settings 1201.

The verification screen 1210 in FIG. 12B is a screen for providing a function to verify whether the document saved in the HDD 204 is a valid document using the blockchain apparatus 111 and is an example of the screen displayed on the Web browser on the PC 102.

Figure 13:
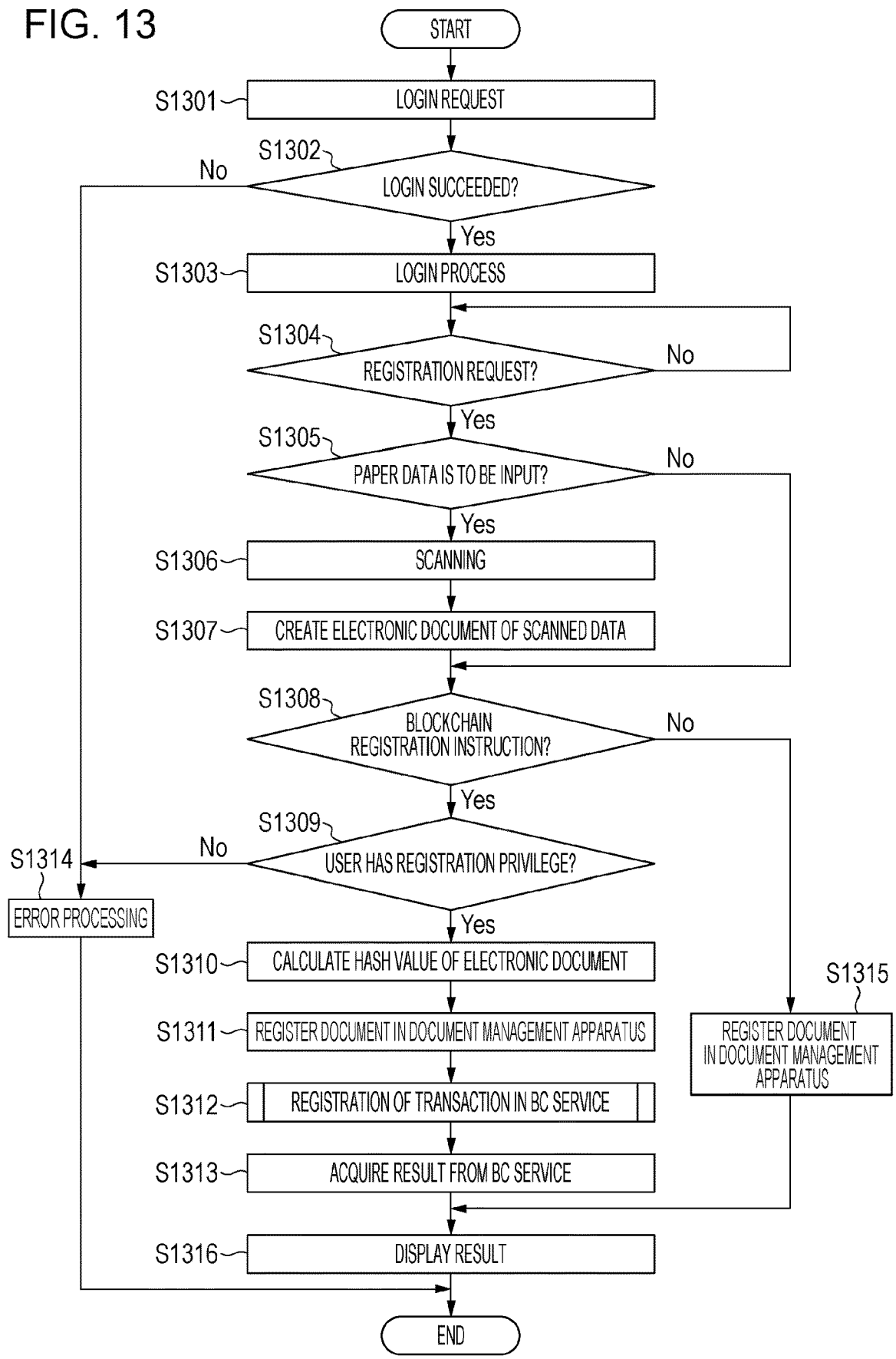
FIG. 13 is a flowchart of a process of registering document information in the blockchain apparatus.

FIG. 13 is a flowchart of a process of registering the information about the document in the blockchain apparatus 111, which is performed in the image forming apparatus 101. Although the case is described in the first embodiment in which the user uses the image forming apparatus 101 via the control unit 200, the user may use the image forming apparatus 101 via the Web browser on the PC 102. The flowchart is started upon touch of the Login button 703 on the authentication screen 700. First, the user authentication processor 402 is executed in the CPU 201.

At start of the process in the flowchart, the user name and the password input by the user of the image forming apparatus 101 on the authentication screen 700 are passed to the user authentication processor 402. In Step S1301, the user authentication processor 402 accepts the user name and the password as a login request.

In Step S1302, the user authentication processor 402 confirms whether the user name and the password that are received coincide with the user name and the password in the user information table in Table 1. If the user name and the password coincide with the user name and the password in the user information table in Table 1, the user authentication processor 402 assumed that the user authentication succeeded and the process goes to Step S1303. If the user name and the password do not coincide with the user name and the password in the user information table in Table 1, the user authentication processor 402 assumed that the user authentication failed and the process goes to Step S1314.

In Step S1303, the user authentication processor 402 holds the user name accepted in Step S1301 in the RAM 203 as the user who currently logs in the image forming apparatus 101 as a login process. Then, the user authentication processor 402 passes the process to the local UI controller 400. The local UI controller 400, which takes over the process, displays the function selection screen 900 in the operation unit 209. The application A 404 is executed in the CPU 201 in the subsequent process in this flowchart upon touch of the Registration of document button on the function selection screen 900 by the user.

The application A 404, which takes over the process, displays a screen in which restriction of the functions is reflected based on the role of the user who currently logs in the image forming apparatus 101. Specifically, since the BC registration is inhibited for the corresponding role Guest User when the user name of the user who logs in the image forming apparatus 101 is Guest, the application A 404 displays in the operation unit 209 the registration screen 1010 on which the document registration function into the blockchain apparatus 111 is restricted. Since the BC registration is permitted when the user who logs in the image forming apparatus 101 has the user name other than Guest, the application A 404 displays the registration screen 1000 in the operation unit 209.

In Step S1314, the application A 404 displays the failure of the user authentication or no privilege of use of the blockchain apparatus 111 in the operation unit 209 via the operation unit I/F 205 as error processing. Then, the process in FIG. 13 is terminated. In Step S1304, the application A 404 waits for touch of the Blockchain button 1003 for the registration on the registration screen 1000. The process goes to Step S1305 when the Blockchain button 1003 is touched.

In Step S1305, the process goes to Step S1306 if Scan is selected on the registration screen 1000 and the process goes to Step S1308 if Saved document is selected. In Step S1306, the application A 404 performs the scanning on the paper document using the scanner 211. In Step S1307, the application A 404 creates the electronic document from the data scanned in Step S1306 in accordance with the scanning settings 1002 and temporarily saves the electronic document in the HDD 204. The temporary data is deleted after the flowchart in FIG. 13 is terminated.

In Step S1308, the application A 404 determines whether a blockchain registration instruction is issued. In the first embodiment, the process goes to Step S1309 if the user who logs in the image forming apparatus 101 has the user name other than Guest and if the Blockchain button 1003 is selected on the registration screen 1000. The process goes to Step S1315 if the user name of the user who logs in the image forming apparatus 101 is Guest, or if the user who logs in the image forming apparatus 101 has the user name other than Guest and if the Blockchain button 1003 is not selected on the registration screen 1000.

In Step S1309, the application A 404 confirms whether the user of the image forming apparatus 101 has the privilege to use the blockchain apparatus 111. The process goes to Step S1310 if the user of the image forming apparatus 101 has the privilege to use the blockchain apparatus 111. The process goes to Step S1314 if the user of the image forming apparatus 101 does not have the privilege to use the blockchain apparatus 111. When only the authorized user of the image forming apparatus 101 is intended to use the blockchain apparatus 111, a method of assuming that the user has the privilege if the role of the user name held in Step S1303 is not Guest User may be used. In the determination of the privilege to use the blockchain apparatus 111, the role dedicated to the blockchain may be created, as described above, and the privilege to use the blockchain apparatus 111 may be determined based on the role dedicated to the blockchain.

In Step S1310, the application A 404 calculates the hash value of the electronic document created in Step S1307. In Step S1311, the application A 404 requests the document management apparatus 103 to register the electronic document created in Step S1307 and, as a result, acquires the ID representing the electronic document the registration of which has been completed and the date and time information representing the date and time when the registration has been completed.

Although the application A 404 performs the process until Step S1311, the blockchain application 406 performs the process in Step S1312. In Step S1312, the blockchain application 406 registers the electronic document in the blockchain apparatus 111. The registration process into the blockchain apparatus 111 will be described below with reference to FIG. 17. The values to be specified for the transaction 601 for the registration and the credential information will now be described.

The hash value calculated in Step S1310 is specified as the document hash value 602. The ID representing the electronic document, received in Step S1311, is specified as the document identification information 603. The hash value of the credential information C 407 in the image forming apparatus 101 which has performed the printing is specified as the registered device identification information 604. The date and time information which is received in Step S1311 and which represents the date and time when the registration has been completed is specified as the document registration date and time 605. The hash value of the user name which has performed the registration operation and which logs in the image forming apparatus 101 is specified as the document registrant 606. Since the original document does not exist in the flowchart in FIG. 13, no value is specified as the original document hash value 607.

The application A 404 passes the credential information A 408 to the blockchain application 406, in addition to the values specified in the transaction 601. The credential information A 408 is used by the blockchain application 406 to verify whether the series of processing concerning the registration is performed by an authorized application.

In Step S1313, the application A 404 acquires the result of the registration process into the blockchain apparatus 111 from the blockchain application 406. In Step S1315, the application A 404 performs the same step as Step S1311. Then, the process goes to Step S1316. The normal document registration in which the blockchain registration is not performed may be performed.

In Step S1316, the application A 404 displays the registration result acquired in Step S1313 in the operation unit 209 via the operation unit I/F 205. Information (not illustrated) about whether the registration into the document management apparatus 103 succeeded, whether the registration into the blockchain apparatus 111 succeeded, and so on is displayed on the screen. Then, the process in FIG. 13 is terminated.

Figure 14:
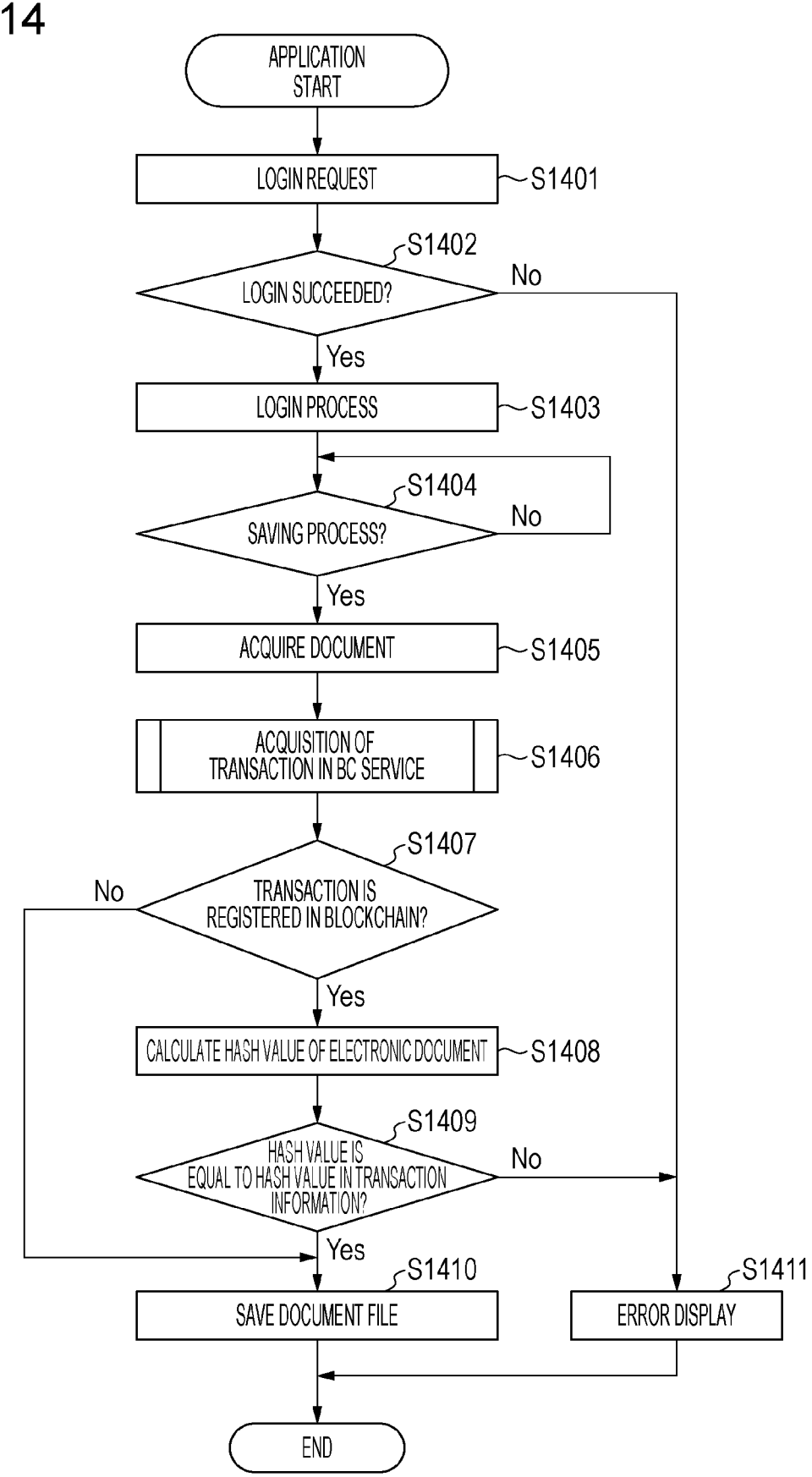
FIG. 14 is a flowchart of a process of acquiring an electronic document from the document management apparatus and saving the electronic document.

FIG. 14 is a flowchart of a process of saving the electronic document saved in the document management apparatus 103 in the image forming apparatus 101. Although the case is described in the first embodiment in which the user uses the image forming apparatus 101 via the control unit 200, the user may use the image forming apparatus 101 via the Web browser on the PC 102. The flowchart is started upon touch of the Login button 703 on the authentication screen 700. First, the user authentication processor 402 is executed in the CPU 201.

At start of the process in the flowchart, the user name and the password input by the user of the image forming apparatus 101 on the authentication screen 700 are passed to the user authentication processor 402. In Step S1401, the user authentication processor 402 accepts the user name and the password as the login request. In Step S1402, the user authentication processor 402 confirms whether the user name and the password that are received coincide with the user name and the password in the user information table in Table 1. If the user name and the password coincide with the user name and the password in the user information table in Table 1, the user authentication processor 402 assumed that the user authentication succeeded and the process goes to Step S1403. If the user name and the password do not coincide with the user name and the password in the user information table in Table 1, the user authentication processor 402 assumed that the user authentication failed and the process goes to Step S1411.

In Step S1403, the user authentication processor 402 holds the user name accepted in Step S1401 in the RAM 203 as the user who currently logs in the image forming apparatus 101 as the login process. Then, the user authentication processor 402 passes the process to the local UI controller 400. The local UI controller 400, which takes over the process, displays the function selection screen 900 in the operation unit 209. The application A 404 is executed in the CPU 201 in the subsequent process in this flowchart upon touch of the Saving/printing of registered document button on the function selection screen 900 by the user. The application A 404, which takes over the process, displays the saving/printing-of-registered-document screen 1100 in the operation unit 209.

In Step S1404, the application A 404 displays the saving/printing-of-registered-document screen 1100 illustrated in FIG. 11A in the operation unit 209 via the operation unit I/F 205 and waits for touch of the Save button 1103. The process goes to Step S1405 when the Save button 1103 is touched.

In Step S1405, the application A 404 acquires the electronic document selected from the document selection list 1101 on the saving/printing-of-registered-document screen 1100 from the image forming apparatus 101. The document information about the acquired electronic document is temporarily saved in the RAM 203 and the document file is temporarily saved in the HDD 204.

Although the application A 404 performs the process until Step S1405, the blockchain application 406 performs the process in Step S1406. In Step S1406, the blockchain application 406 acquires the transaction 601 holding the ID in the document information saved in the RAM 203 in the document identification information 603. The acquisition process will be described below with reference to FIG. 17.

The application A 404 passes the credential information A 408 to the blockchain application 406. The credential information A 408 is used by the blockchain application 406 to verify whether the series of processing concerning the acquisition of the electronic document is performed by an authorized application.

In Step S1407, the application A 404 determines whether the corresponding transaction information is acquired in Step S1406. If no transaction information exists, the process goes to Step S1410 because the information is not managed in the blockchain apparatus 111. If the transaction information exists, the process goes to Step S1408.

In Step S1408, the application A 404 calculates the hash value from the document data saved in the HDD 204. In Step S1409, the application A 404 determines whether the calculated hash value is equal to the document hash value 602 in the transaction information acquired in Step S1406. If the calculated hash value is not equal to the document hash value 602 in the transaction information, the process goes to Step S1411 for error display because the document file saved in the document management apparatus 103 is invalid data. If the calculated hash value is equal to the document hash value 602 in the transaction information, the process goes to Step S1410.

In Step S1410, the application A 404 moves the document data temporarily saved in the HDD 204 in Step S1405 to a correct saving location in the HDD 204. Although the document data is saved in the HDD 204 in the image forming apparatus 101 in the first embodiment, the path to the saving location may be specified on the saving/printing-of-registered-document screen 1100 and the document data may be saved in the specified location.

In Step S1411, the application A 404 performs the error display when the acquisition is not permitted in the flowchart in FIG. 14. Specifically, an error dialog box (not illustrated) is displayed on the screen. At this time, the document file temporarily saved in the HDD 204 is deleted.

Figure 15:
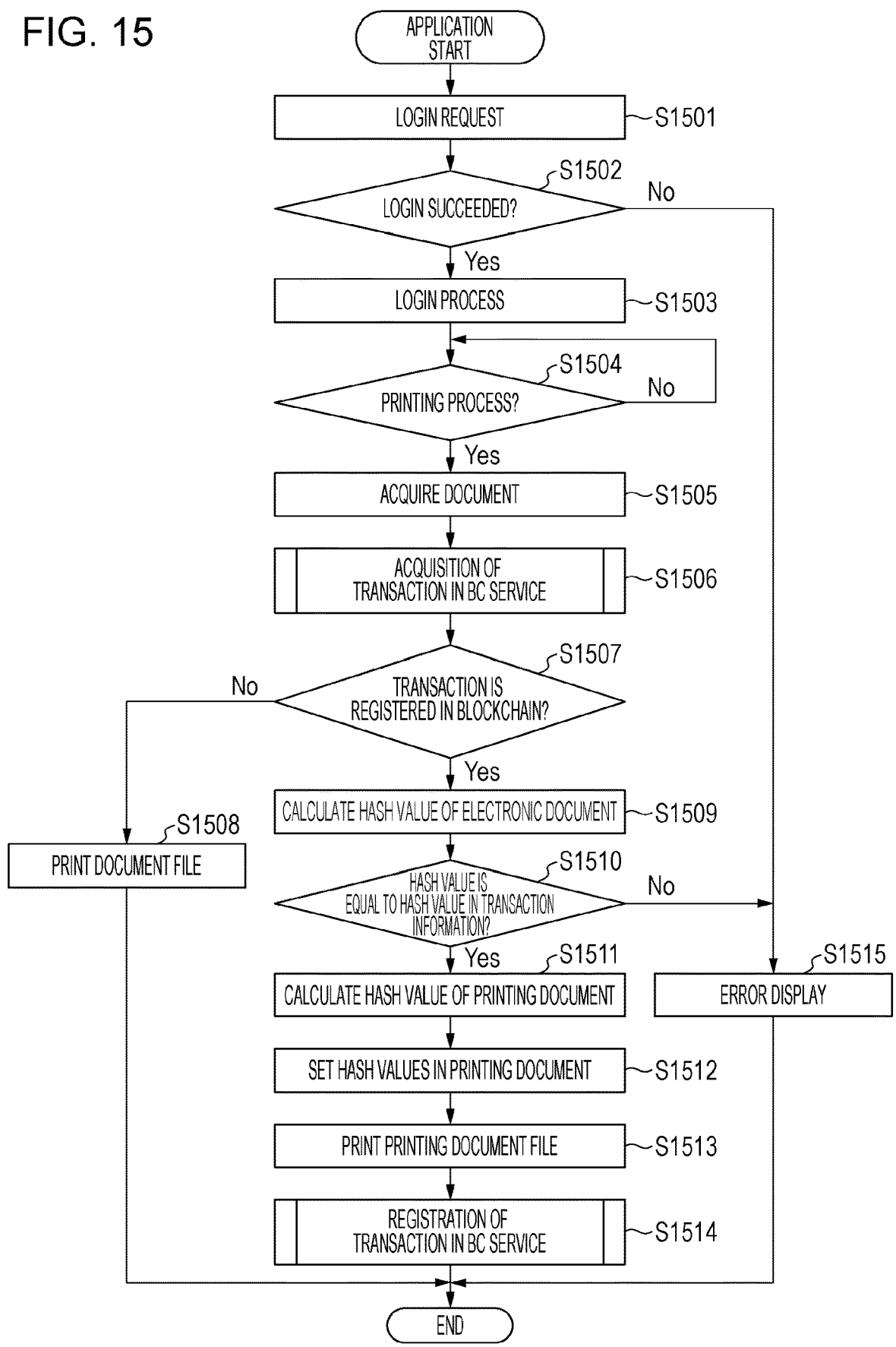
FIG. 15 is a flowchart of a process of printing the electronic document in the image forming apparatus.

FIG. 15 is a flowchart of a process of printing the electronic document saved in the document management apparatus 103 from the image forming apparatus 101. Although the case is described in the first embodiment in which the user uses the image forming apparatus 101 via the control unit 200, the user may use the image forming apparatus 101 via the Web browser on the PC 102. The flowchart is started upon touch of the Login button 703 on the authentication screen 700. First, the user authentication processor 402 is executed in the CPU 201.

At start of the process in the flowchart, the user name and the password input by the user of the image forming apparatus 101 on the authentication screen 700 are passed to the user authentication processor 402. In Step S1501, the user authentication processor 402 accepts the user name and the password as the login request. In Step S1502, the user authentication processor 402 confirms whether the user name and the password that are received coincide with the user name and the password in the user information table in Table 1. If the user name and the password coincide with the user name and the password in the user information table in Table 1, the user authentication processor 402 assumed that the user authentication succeeded and the process goes to Step S1503. If the user name and the password do not coincide with the user name and the password in the user information table in Table 1, the user authentication processor 402 assumed that the user authentication failed and the process goes to Step S1515.

In Step S1503, the user authentication processor 402 holds the user name accepted in Step S1501 in the RAM 203 as the user who currently logs in the image forming apparatus 101 as the login process. Then, the user authentication processor 402 passes the process to the local UI controller 400. The local UI controller 400, which takes over the process, displays the function selection screen 900 in the operation unit 209. The application A 404 is executed in the CPU 201 in the subsequent process in this flowchart upon touch of the Saving/printing of registered document button on the function selection screen 900 by the user. The application A 404, which takes over the process, displays the saving/printing-of-registered-document screen 1100 in the operation unit 209.

In Step S1504, the application A 404 displays the saving/printing-of-registered-document screen 1100 illustrated in FIG. 11A in the operation unit 209 via the operation unit I/F 205 and waits for touch of the Print button 1102. The process goes to Step S1505 when the Print button 1102 is touched. In Step S1505, the application A 404 acquires the electronic document selected from the document selection list 1101 on the saving/printing-of-registered-document screen 1100 from the image forming apparatus 101. The document information about the acquired electronic document is temporarily saved in the RAM 203 and the document file is temporarily saved in the HDD 204.

Although the application A 404 performs the process until Step S1505, the blockchain application 406 performs the process in Step S1506. In Step S1506, the blockchain application 406 acquires the transaction 601 holding the ID in the document information saved in the RAM 203 in the document identification information 603. The acquisition process will be described below with reference to FIG. 17.

The application A 404 passes the credential information A 408 to the blockchain application 406. The credential information A 408 is used by the blockchain application 406 to verify whether the series of processing concerning the acquisition of the electronic document is performed by an authorized application.

In Step S1507, the application A 404 determines whether the corresponding transaction is acquired in Step S1506. If no transaction information exists, the process goes to Step S1508 because the document is not managed in the blockchain apparatus 111. If the transaction information exists, the process goes to Step S1509.

In Step S1508, the application A 404 prints the document data saved in the HDD 204 with the printer 210 via the printer I/F 206 in the image forming apparatus 101. In Step S1509, the application A 404 calculates the hash value from the document data saved in the HDD 204. In Step S1510, the application A 404 determines whether the calculated hash value is equal to the document hash value 602 in the transaction information acquired in Step S1506. If the calculated hash value is not equal to the document hash value 602 in the transaction information, the process goes to Step S1515 for error display because the document file saved in the document management apparatus 103 is invalid data. If the calculated hash value is equal to the document hash value 602 in the transaction information, the process goes to Step S1511.

In Step S1511, the application A 404 calculates the hash value to be set in the printing document. The calculation is performed using the document hash value 602 in the transaction information acquired in Step S1506, the credential information C 407 in the image forming apparatus 101 performing the process, and the date and time information in the image forming apparatus at the time of Step S1511.

In Step S1512, the application A 404 sets the hash value representing the print, which is calculated in Step S1511, and the document hash value 602 in the transaction information, which represents the original image, in the file to be printed in Step S1513. The hash values are set in a format that is readable in scanning of the printed sheet of paper in verification described below. The hash values may be set as information that can be determined on the print as a two-dimensional barcode or may be embedded as invisible information.

In Step S1513, the application A 404 prints the document file in which the hash values are set with the printer 210 via the printer I/F 206 in the image forming apparatus 101. Although the application A 404 performs the process until Step S1513, the blockchain application 406 performs the process in Step S1514. In Step S1514, the blockchain application 406 registers the information about the printing process in the blockchain apparatus 111. The registration process will be described below with reference to FIG. 17. The values to be specified in the transaction 601 for the registration will now be described.

The hash value of the printing document, calculated in Step S1511, is specified as the document hash value 602. The ID representing the electronic document received as an argument is specified as the document identification information 603. The hash value of the credential information C 407 in the image forming apparatus 101 which has performed the printing is specified as the registered device identification information 604. The date and time information when the hash value is calculated in Step S1511 is specified as the document registration date and time 605. The hash value of the user name which logs in the image forming apparatus 101 that has performed the printing is specified as the document registrant 606. The document hash value 602 in the transaction information which is acquired in Step S1506 and which represents the original image is specified as the original document hash value 607.

The application A 404 passes the credential information A 408 to the blockchain application 406. The credential information A 408 is used by the blockchain application 406 to verify whether the series of processing concerning the acquisition of the electronic document is performed by an authorized application. In Step S1515, the application A 404 performs the error display when the printing is not permitted in the flowchart in FIG. 15. Specifically, an error dialog box (not illustrated) is displayed on the screen.

Figure 16:
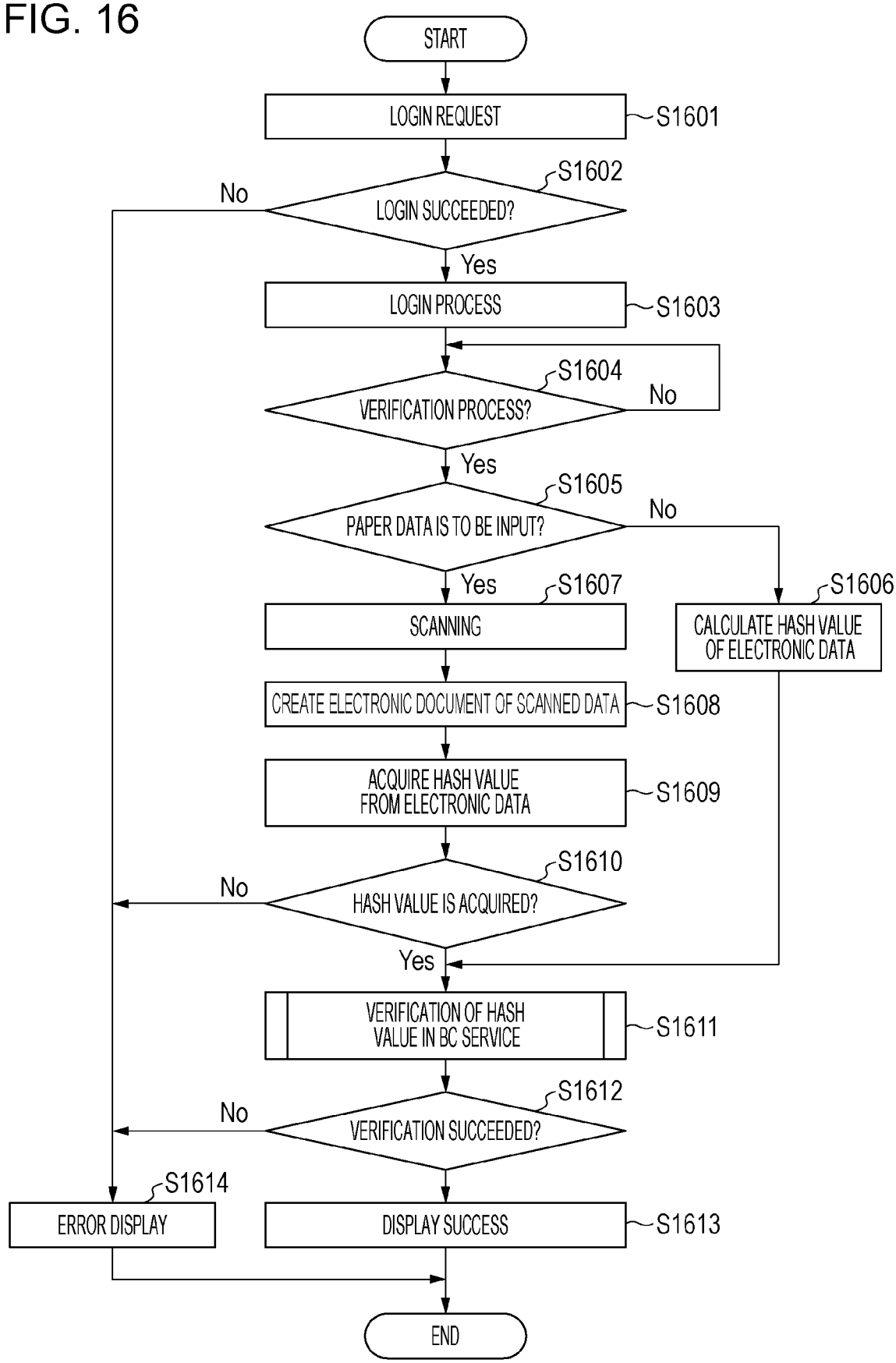
FIG. 16 is a flowchart of a process of verifying the electronic document.

FIG. 16 is a flowchart of a process of verifying the document file specified by the user or the printed paper document from the image forming apparatus 101. The flowchart is started upon touch of the Login button 703 on the authentication screen 700 or the Guest login button 711 on the authentication screen 710 of the image forming apparatus 101, illustrated in FIG. 7A and FIG. 7B. First, the user authentication processor 402 is executed in the CPU 201. At start of the process in the flowchart, the user name and the password input by the user of the image forming apparatus 101 on the authentication screen 700 are passed to the user authentication processor 402.

In Step S1601, the user authentication processor 402 accepts the user name and the password as the login request. In Step S1602, the user authentication processor 402 confirms whether the user name and the password that are received coincide with the user name and the password in the user information table in Table 1. If the user name and the password coincide with the user name and the password in the user information table in Table 1, the user authentication processor 402 assumed that the user authentication succeeded and the process goes to Step S1603. If the user name and the password do not coincide with the user name and the password in the user information table in Table 1, the user authentication processor 402 assumed that the user authentication failed and the process goes to Step S1614.

In Step S1603, the user authentication processor 402 holds the user name accepted in Step S1601 in the RAM 203 as the user who currently logs in the image forming apparatus 101 as the login process. Then, the user authentication processor 402 passes the process to the local UI controller 400. The local UI controller 400, which takes over the process, displays the function selection screen 900 in the operation unit 209. The application A 404 is executed in the CPU 201 in the subsequent process in this flowchart upon touch of the Verification of document button on the function selection screen 900 by the user. The application A 404, which takes over the process, displays the verification screen 1200 in the operation unit 209.

In Step S1604, the application A 404 displays the verification screen 1200 illustrated in FIG. 12A in the operation unit 209 via the operation unit I/F 205 and waits for touch of the Verify button 1203. The process goes to Step S1605 when the Verify button 1203 is touched. In Step S1605, the application A 404 determines whether the target document is paper data based on the value of the document selection settings 1201, which are received at start of the process. The process goes Step S1607 if the target document is the paper data and goes to Step S1606 if the target document is the electronic data.

In Step S1606, the application A 404 identifies the selected electronic data in the HDD 204 and calculates the hash value of the electronic data. The hash value represents the document to be verified and is used in a verification process in Step S1611. In Step S1607, the application A 404 scans the paper document set in the image forming apparatus 101. In the scanning, the paper document is read by the scanner 211 via the scanner I/F 207 to generate the image data.

In Step S1608, the application A 404 creates the electronic document from the image data generated by the scanner 211 and temporarily saves the electronic document in the HDD 204 as the electronic data. The temporary data is deleted after the flowchart in FIG. 16 is terminated. In Step S1609, the application A 404 acquires the hash value embedded in the electronic data saved in the HDD 204 in Step S1608. Here, the process of acquiring the hash value, which is matched with the embedding method in Step S1512 in the printing flowchart described above with reference to FIG. 15, is performed.

In Step S1610, the application A 404 determines whether the hash value is acquired from the electronic data. If the hash value is acquired, the process goes to Step S1611. If the hash value is not acquired, the process goes to Step S1614 because the verification is unavailable. Although the application A 404 performs the process until Step S1610, the blockchain application 406 performs the process in Step S1611.

In Step S1611, the blockchain application 406 performs a document verification process using the transaction information recorded on the blockchain apparatus 111. The document verification process will be described below with reference to FIG. 17. In the document verification process, the document verification, the document hash value calculated in Step S1606 or acquired in Step S1609, and the credential information A 408 are passed as processing types.

Upon reception of the response of the result of the requested process, in Step S1612, the application A 404 determines the result of the verification. If the verification succeeded, in Step S1613, the application A 404 displays a standard dialog box (not illustrated) including a message indicating that, for example, the verification succeeded. If the verification failed, in Step S1614, the application A 404 displays a standard dialog box (not illustrated) including a message indicating that the verification failed or the verification is unavailable. After displaying each message, the flowchart in FIG. 16 is terminated upon issue of an instruction to close the dialog box from the user.

Figure 17:
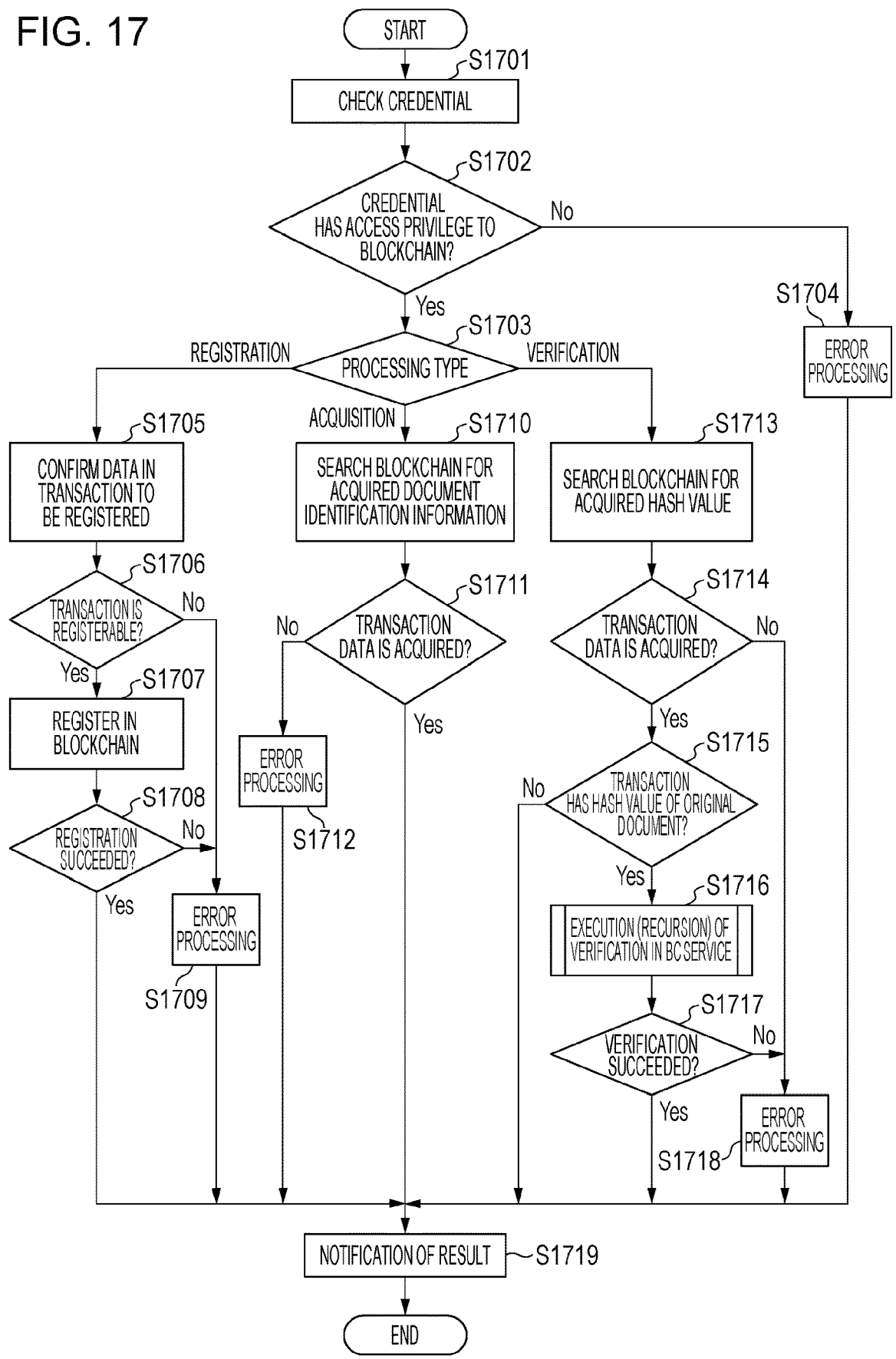
FIG. 17 is a flowchart of a transaction process into the blockchain apparatus.

FIG. 17 is a flowchart of a transaction process into the blockchain apparatus 111, which is performed by the blockchain application 406 in the image forming apparatus 101. The process in the flowchart is started and performed as the blockchain application 406 during the steps performed by the application A 404 in FIG. 13 to FIG. 16.

At start of the process in the flowchart, the processing type in the blockchain apparatus 111 and information necessary for each processing type are passed from the application A 404. The information necessary for each processing type is the transaction 601 in the registration of the transaction, the document hash value 602 necessary to be verified in the verification of the document, and the document identification information 603 in the acquisition of the transaction.

In Step S1701, the blockchain application 406 passes the credential information C 407 and the credential information A 408 to the blockchain apparatus 111 to confirm whether the credential information C 407 and the credential information A 408 are valid credential information. The information acquired from the credential information manager 410 at startup of the blockchain application 406 is used as the credential information C 407, and the information acquired from the application A 404 is used as the credential information A 408.

In Step S1702, the blockchain application 406 determines whether the credential information confirmed in Step S1701 is valid information. In the determination of whether the credential information is valid information, when the credential information is a digital certificate, the blockchain application 406 performs the verification of the certificate and determines that the credential information is valid credential information if the verification succeeded. When the credential information is a predetermined data value, the blockchain application 406 determines that the credential information is valid credential information if the value of the credential information is equal to the predetermined data value. If the credential information is valid credential information, the process goes to Step S1703 because access to the blockchain apparatus 111 is available. If the credential information is not valid credential information, the process goes to Step S1704.

In Step S1703, the blockchain application 406 determines the received processing type. The process goes to Step S1705 if the processing type is the registration of the transaction, goes to Step S1710 if the processing type is the acquisition of the transaction, and goes to Step S1713 if the processing type is the verification of the document.

In Step S1704, the blockchain application 406 generates error information indicating that access privilege to the blockchain apparatus 111 is not met in the process in the flowchart.

In Step S1705, the blockchain application 406 confirms whether all the transaction information received at start of the process exists. The blockchain application 406 searches the blockchain apparatus 111 to confirm whether the document hash value 602 is not registered in the blockchain apparatus 111 and whether the original document hash value 607 is registered in the blockchain apparatus 111. If all the transaction information does not exist or the hash value is not in a correct state, the transaction information is invalid information. In Step S1706, the blockchain application 406 determines the result of the confirmation. The process goes to Step S1707 if the transaction information is valid information and goes to Step S1709 for error processing if the transaction information is invalid information.

In Step S1707, the blockchain application 406 requests the blockchain apparatus 111 to register the confirmed transaction 601. In this step, success or failure is received from the blockchain apparatus 111 as the result of the registration process.

In Step S1708, the blockchain application 406 determines the processing result from the blockchain apparatus 111. The process goes to Step S1709 for the error processing if the processing result is failure and goes to in Step S1719 for notification of the result if the processing result is success. In Step S1709, the blockchain application 406 generates error information indicating that the registration of the transaction is unavailable in the process in the flowchart.

In Step S1710, the blockchain application 406 searches the blockchain apparatus 111 for the transaction holding the document identification number received at start of the process to acquire the transaction. In Step S1711, the blockchain application 406 determines the result of the search. If the transaction data is not acquired, the process goes to Step S1712 for error processing because the target document is not registered in the blockchain apparatus 111. If the transaction data is acquired, the process goes to Step S1719. In Step S1712, the blockchain application 406 generates error information indicating that the acquisition of the transaction failed in the process in the flowchart.

In Step S1713, the blockchain application 406 searches the blockchain apparatus 111 for the transaction holding the hash value received at start of the process as the document hash value to acquire the transaction. In Step S1714, the blockchain application 406 determines the result of the search. If the transaction data is acquired, the blockchain application 406 determines that the hash value is a valid hash value and the process goes to Step S1715. If the transaction data is not acquired, the blockchain application 406 determines that the hash value is an invalid hash value and the process goes to Step S1718 for error processing.

In Step S1715, the blockchain application 406 determines whether the transaction acquired in Step S1713 has the original document hash value. If the transaction does not have the original document hash value, the verification process is terminated because the hash value confirmed in Step S1713 indicates the first document and the process goes to Step S1719. If the transaction has the original document hash value, the process goes to Step S1716 because it is necessary to confirm the presence of the original document.

In Step S1716, the blockchain application 406 specifies the verification of the document as the processing type and the original document hash value as the information necessary for the process to perform recursion of the flowchart in FIG. 17. In Step S1717, the blockchain application 406 determines the result of the recursion. If the verification including the original document succeeded, the process goes to Step S1719. If the verification failed, the process goes to Step S1718 for the error processing. In Step S1718, the blockchain application 406 generates error information indicating that the verification of the document failed in the process in the flowchart.

In Step S1719, the blockchain application 406 notifies the source process of a registration completion status in the case of the registration of the transaction and a verification success status in the case of the verification of the document as information when the process succeeded for each processing type. The blockchain application 406 notifies the source process of the acquired transaction information in the case of the acquisition of the transaction and the error information in the case of the error processing.

Confirmation of the privilege based on the login and the role of the user in the above manner in the first embodiment enables many users and/or many apparatuses to use the blockchain service.

Other Embodiments

The present invention is capable of being realized by supplying programs realizing one or more functions in the embodiments described above to a system or an apparatus via a network or a storage medium and reading out and executing the programs by one or more processors in the computer in the system or the apparatus. The present invention is capable of being realized by a circuit (for example, an application specific integrated circuit (ASIC)) realizing one or more functions.

An information processing apparatus is provided, which serves as a hub device of the blockchain service.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An information processing apparatus that cooperates with a management service that receives and stores electronic data via a network and a blockchain service that manages information about the stored electronic data in units of blocks and manages the plurality of blocks in a plurality of nodes with association of each block with blocks before and after the block being defined, the information processing apparatus comprising:
one or more processors that executes a set of instructions, the instructions, when executed, causing the information processing apparatus to perform operations comprising:
storing authentication information used in authentication of a user in association with role information indicating a privilege given to the user;
performing an authentication process upon reception of the authentication information and causing the user who is authenticated to log in the information processing apparatus and to use a function of the information processing apparatus in accordance with the role information that is confirmed; and,
as a cooperation function, providing the information about the stored electronic data to the blockchain service,
wherein the authenticated user is permitted to use the cooperation function it is confirmed that the role information indicating that a function to cooperate the blockchain service is available is included in the confirmed role information and the authenticated user is not permitted to use the cooperation function if it is confirmed that the role information indicating that the function to cooperate with the blockchain service is unavailable is included in the confirmed role information.

2. The information processing apparatus according to claim 1, wherein the operations further comprise:
executing an application that transmits the electronic data to the management service via the network and that does not directly communicate with the blockchain service,
wherein, when the application accepts an instruction to use the blockchain service from the authenticated user, the application transmits the electronic data to the management service via the network and transmits the information about the electronic data using the cooperation function.

3. The information processing apparatus according to claim 2,
wherein the application provides screen information on which an instruction to use a scanning function of the information processing apparatus is accepted from the user to a remote user interface (UI) or a local UI and, if the use of the cooperation function is determined to be permitted to the authenticated user, provides the screen information on which the instruction to use the blockchain service or an instruction not to use the blockchain service is accepted from the user, in addition to the instruction to use the scanning function.

4. The information processing apparatus according to claim 1, wherein the operations further comprise:
executing a print application that receives and prints the electronic data from the management service via the network and that does not directly communicate with the blockchain service,
wherein, when the print application receives an instruction to print the electronic data stored in the management service from the authenticated user, the cooperation function acquires the information about the electronic data registered in the blockchain service and the print application prints the electronic data after the cooperation function acquires the information about the electronic data.

5. The information processing apparatus according to claim 1,
wherein the operations further comprise providing a guest login that permits the user to log in the information processing apparatus without the authentication, wherein the role information indicating that the function to cooperate with the blockchain service is unavailable is given to the user who logs in the information processing apparatus as a guest.

6. The information processing apparatus according to claim 1,
wherein the operations further comprise acquiring credential information indicating that the cooperation with the blockchain service is permitted, and wherein the credential information is not supplied to a user of another information processing apparatus that transmits an instruction to use the blockchain service via a remote UI to the information processing apparatus.

7. A non-transitory computer-readable storage medium storing computer-executable instructions that, when executed by a computer, cause the computer to perform a method of controlling an information processing apparatus that cooperates with a management service that receives and stores electronic data via a network and a blockchain service that manages information about the stored electronic data in units of blocks and manages the plurality of blocks in a plurality of nodes with association of each block with blocks before and after the block being defined, the method comprising:

a storing step of storing authentication information used in authentication of a user in association with role information indicating a privilege given to the user;

a login step of performing an authentication process upon reception of the authentication information and causing the user who is authenticated to log in the information processing apparatus and to use a function of the information processing apparatus in accordance with the role information that is confirmed; and a cooperating step of providing the information about the stored electronic data to the blockchain service, wherein the authenticated user is permitted to use the cooperating step if it is confirmed that the role information indicating that a function to cooperate with the blockchain service is available is included in the confirmed role information and the authenticated user is not permitted to use the cooperating step if it is confirmed that the role information indicating that the function to cooperate with the blockchain service is unavailable is included in the confirmed role information.

8. The non-transitory computer-readable storage medium according to claim 7, wherein the information processing apparatus includes an application that transmits the electronic data to the management service via the network and that does not directly communicate with the blockchain service, and wherein, when the application accepts an instruction to use the blockchain service from the authenticated user, the application transmits the electronic data to the management service via the network and transmits the information about the electronic data to the cooperating step.

9. The non-transitory computer-readable storage medium according to claim 8, wherein the application provides screen information on which an instruction to use a scanning function of the information processing apparatus is accepted from the user to a remote user interface (UI) or a local UI and, if the use of the cooperation step is determined to be permitted to the authenticated user, provides the screen information on which the instruction to use the blockchain service or an instruction not to use the blockchain service is accepted from the user, in addition to the instruction to use the scanning function.

10. The non-transitory computer-readable storage medium according to claim 7, wherein the information processing apparatus includes a print application that receives and prints the electronic data from the management service via the network and that does not directly communicate with the blockchain service, and wherein, when the print application receives an instruction to print the electronic data stored in the management service from the authenticated user, the cooperating step acquires the information about the electronic data registered in the blockchain service and the print application prints the electronic data after the cooperating step acquires the information about the electronic data.

11. The non-transitory computer-readable storage medium according to claim 7, wherein the login step supports guest login to cause the user to log in the information processing apparatus without the authentication and the role information indicating that the function to cooperate with the blockchain service is unavailable is given to the user who logs in the information processing apparatus as a guest.

12. The non-transitory computer-readable storage medium according to claim 7, wherein the cooperating step acquires credential information indicating that the cooperation with the blockchain service is permitted, and wherein the credential information is not supplied to a user of another information processing apparatus that transmits an instruction to use the blockchain service via a remote UI to the information processing apparatus.

13. A method of controlling an information processing apparatus that cooperates with a management service that receives and stores electronic data via a network and a blockchain service that manages information about the stored electronic data in units of blocks and manages the plurality of blocks in a plurality of nodes with association of each block with blocks before and after the block being defined, the method comprising:

a storing step of storing authentication information used in authentication of a user in association with role information indicating a privilege given to the user;

a login step of performing an authentication process upon reception of the authentication information and causing the user who is authenticated to log in the information processing apparatus and to use a function of the information processing apparatus in accordance with the role information that is confirmed; and a cooperating step of providing the information about the stored electronic data to the blockchain service, wherein the authenticated user uses the cooperating step if it is confirmed that the role information indicating that a function to cooperate with the blockchain service is available is included in the confirmed role information and the authenticated user does not use the cooperating step if it is confirmed that the role information indicating that the function to cooperate with the blockchain service is unavailable is included in the confirmed role information.

* * * * *